United States Patent [19]

Kaneda

[11] Patent Number: 5,027,147
[45] Date of Patent: Jun. 25, 1991

[54] OPTICAL EQUIPMENT WITH LENS POSITION CONTROL UTILIZING ZOOM AND FOCUSING MOTORS FOR FOCUSING

[75] Inventor: Naoya Kaneda, Yokohama, Japan

[73] Assignee: Canon Kabushiki Kaisha, Tokyo, Japan

[21] Appl. No.: 487,276

[22] Filed: Mar. 2, 1990

[30] Foreign Application Priority Data

Mar. 2, 1989 [JP] Japan ................................. 1-51726
Mar. 2, 1989 [JP] Japan ................................. 1-51727

[51] Int. Cl.⁵ .................... G03B 5/00; G03B 13/36; G02B 7/28; G02B 15/14
[52] U.S. Cl. ......................... 354/400; 354/195.1; 350/429; 350/255
[58] Field of Search ............... 354/400, 402, 195.1, 354/195.12; 350/429, 430, 255

[56] References Cited

U.S. PATENT DOCUMENTS 4,920,369 4/1990 Kaneda et al. ............... 354/400
4,950,054 8/1990 Wada et al. .................. 350/429

FOREIGN PATENT DOCUMENTS 60-143310 7/1985 Japan .
63-109966 5/1988 Japan .

Primary Examiner—W. B. Perkey
Attorney, Agent, or Firm—Fitzpatrick, Cella, Harper & Scinto

[57] ABSTRACT

An optical equipment with a lens position control device for a zoom lens of inner focus type, enabling a faster focusing operation and also enabling focusing to an object of a very short distance, regardless of the initial state of the zoom lens. The equipment is provided with a first detector for detecting the zoom state, a second detector for detecting the focus state, and a controller varying the control of the zooming lens group and the focusing lens group according to the zooming state. When the focusing lens is to be moved to a position for focusing to a shorter distance, the controller drives the focusing lens group and the zooming lens group during the same time, only if the zooming lens group is at the wide angle side with respect to a predetermined zoom state, thus reducing the focusing time without a significant change in the image angle.

37 Claims, 19 Drawing Sheets

FIG. 11B
(a) 
(b) 
(c) 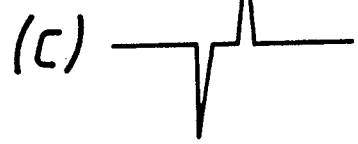
(d) 
(e) 

FIG. 14
| ∞ IN-FOCUS POINT | PASSAGE | 0m IN-FOCUS POINT |
|---|---|---|
| $P_5$ | → $P_{13}$ → $P_{14}$ → | |
| $P_6$ | → $P_{13}$ → $P_{14}$ → | |
| $P_7$ | → $P_{14}$ → | |
| $P_8$ | → | $P_0$ |
| $P_9$ | → $P_{15}$ → | |
| $P_{10}$ | → $P_{16}$ → $P_{17}$ → $P_{15}$ → | |
| $P_{11}$ | → $P_{18}$ → $P_{19}$ → $P_{17}$ → $P_{15}$ → | |
| $P_{12}$ | → $P_{20}$ → $P_{18}$ → $P_{19}$ → $P_{17}$ → $P_{15}$ → | |
FIG. 15
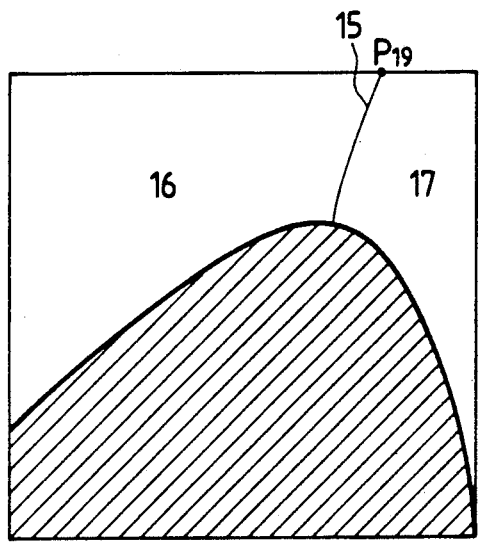
FIG. 16
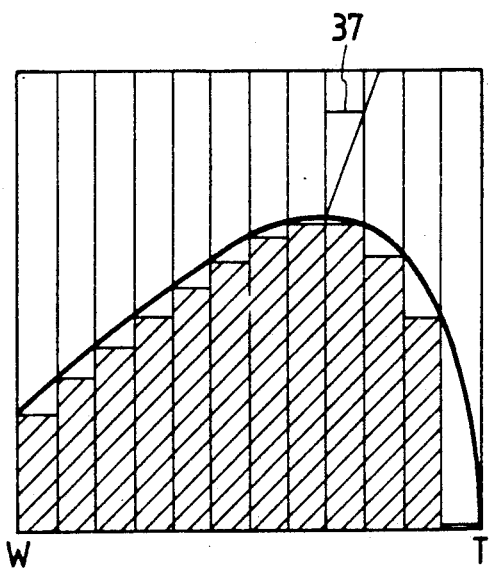

FIG. 18
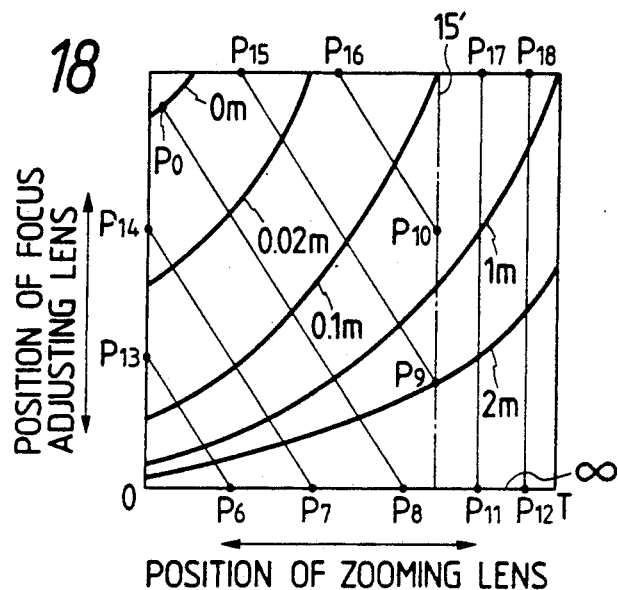
FIG. 19
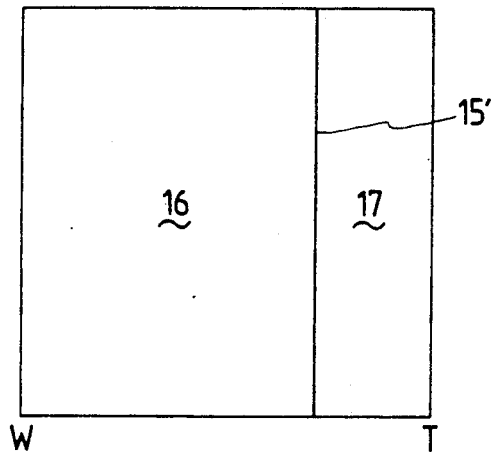
FIG. 20
| ∞ IN-FOCUS POINT | PASSAGE | 0m IN-FOCUS POINT |
|---|---|---|
| P6 | → P13 → P14 → | |
| P7 | → P14 → | |
| P8 | → | P0 |
| P11 | → P17 → P16 → P15 → | |
| P12 | → P18 → P17 → P16 → P15 → | |

| ∞ IN-FOCUS POINT | PASSAGE | 0m IN-FOCUS POINT |
|---|---|---|
| $P_{10}$ | → $P_{11}$ → $P_{12}$ → $P_{15}$ → | |
| $P_{13}$ | → $P_{14}$ → $P_{15}$ → | |
| $P_{16}$ | → $P_{17}$ → $P_{18}$ → | $P_0$ |
| $P_{19}$ | → $P_{20}$ → $P_{21}$ → $P_{18}$ → | |
| $P_{22}$ | → $P_{23}$ → $P_{21}$ → $P_{18}$ → | |
| $P_{24}$ | → $P_{25}$ → $P_{23}$ → $P_{21}$ → $P_{18}$ → | |

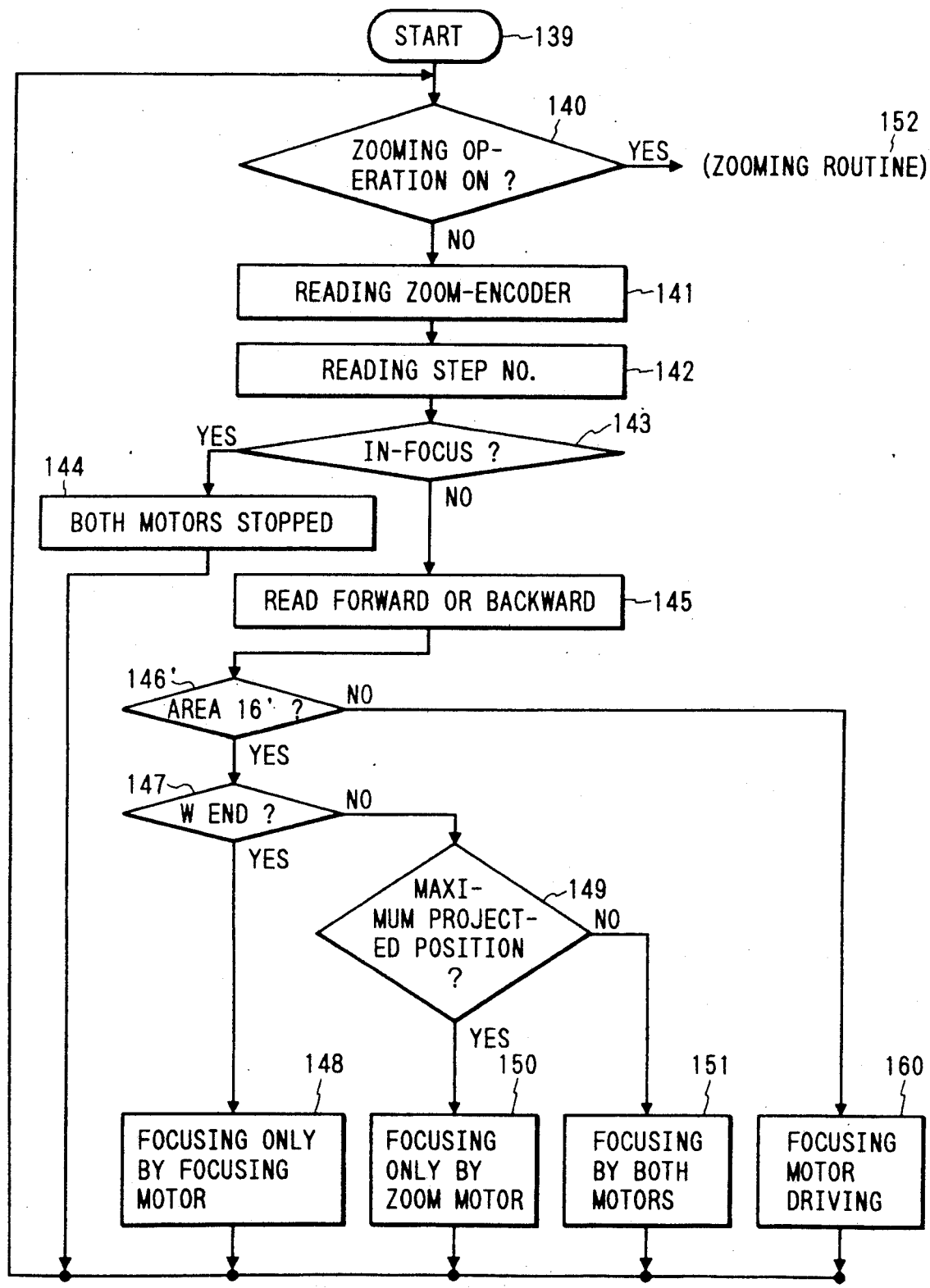

OPTICAL EQUIPMENT WITH LENS POSITION CONTROL UTILIZING ZOOM AND FOCUSING MOTORS FOR FOCUSING

BACKGROUND OF THE INVENTION

1. Field of the Invention

The present invention relates to optical equipment provided with a lens position control device.

2. Related Background Art

There are already known various optical designs for an image-taking lens with variable focal length, a so-called zoom lens, employed for example in a video camera. Among such designs, most commonly known is a so-called 4-group zoom lens consisting of a 1st front lens group for focusing, a 2nd lens group for varying the image magnification, a 3rd lens group for correction and a 4th fixed lens group for image forming, wherein the 2nd and 3rd groups are linked in a predetermined relation to achieve the zooming operation. In such a 4-group zoom lens, the focusing by the 1st lens group is totally independent from the focal length adjustment by the 2nd and 3rd lens groups, so that it is not necessary to move the 1st lens group for zooming nor to move the 2nd lens group for focusing. For this reason a relatively simple mechanism can be employed in the lens barrel.

On the other hand, there is also known a zoom lens of the so-called inner focus type in which the focusing is achieved by the 3rd and following lens groups. In such as lens structure, different from the 4-group zoom lens mentioned above, the shortest focusable distance achieved by most advancing the focusing lens group is variable depending on the focal length. Particularly it provides an advantage, not achievable with the 4-group zoom lens, of focusing even to a very short distance just in front of the lens at the wide angle end. However, in such a zoom lens of inner focus type, the focusing lens group has to be moved in case of zooming even when the distance to the object is constant, since the focusing lens group is positioned behind the zooming lens groups. For this reason such a zoom lens requires a very complicated mechanism in the lens barrel, and has been little used in practice. Nevertheless, a recent development in the automatic focusing device has realized a system of directly evaluating the image blur on the focal plane and controlling the position of the focusing lens group based on thus-obtained information. Thus, the combination of an automatic focusing device and an inner focus type lens in such a system allows proper positioning the focusing lens group, without a complicated barrel structure.

FIGS. 5 to 8 illustrate certain examples of the inner focus lens. In a type shown in FIG. 5, a 1st lens group 1 is fixed. A 2nd lens group is movable between a solid-lined position 2 corresponding to the shortest focal length (wide angle end) to a chain-lined position 2' corresponding to the longest focal length (telephoto end). In this example a 3rd lens group is linked with the 2nd lens group with a certain relation as in the conventional 4-group zoom lens and is movable from a solid-lined position 3 (wide angle end) to a chain-lined position 3' (telephoto end). Said 2nd and 3rd lens groups are linked for example by a cam ring, as in the mechanism for the 4-group zoom lens. A focusing lens group 4 is rendered axially movable within a predetermined range as indicated by an arrow.

An example shown in FIG. 6 lacks the lens group 3 shown in FIG. 5. Also in this example, the lens group 4 is divided into a fixed front lens group 4A and a rear lens group 4B which is axially movable within a predetermined range for focusing.

In an example shown in FIG. 7, 1st and 4th lens groups 1, 4 are fixed, while a 2nd lens group is movable between a wide angle end position 2 and a telephoto end position 2'. A focusing lens group 3 is rendered axially movable within a predetermined range.

In an example shown in FIG. 8, a 1st lens group 1 is not fixed. The 1st and 2nd lens groups are moved in mutual linkage in zooming, between wide angle end positions 1, 2 and telephoto end positions 1', 2'. The focusing is achieved by a rearmost lens group 4B as in the example shown in FIG. 6.

FIGS. 9 and 10 show the relation, in the inner focus lenses shown in FIGS. 5 to 8, between the position of the focusing lens group and the focal length. FIG. 9 corresponds to the lenses shown in FIGS. 6 to 8 while FIG. 10 corresponds to the lens shown in FIG. 5, and the zero position in the ordinate indicates the position of the focusing lens group when focused to the infinite distance at the telephoto end.

In the lenses shown in FIGS. 6 to 8, as shown in FIG. 9, the shortest focusable distance is 0 m at the wide end, about 1 m at the intermediate position or about 0.6 m at the telephoto end. Also in the type of the lens shown in FIG. 5, said distance is 0 m at the wide angle end, and gradually increases to reach about 1 m at the telephoto end.

FIG. 11 shows the basic principle of an example of automatic focusing device of an the aforementioned type for directly evaluating the image blur on the focal plane. In FIG. 11A, there are shown an image frame 17 for example of a video camera, a distance measuring area for extracting a signal for automatic focusing, and a contrast pattern 19 of the object. FIG. 11B shows the method of signal processing. The contrast pattern (a) provides a luminance signal (b) which gives a differentiated signal (c). The absolute value of said signal is taken to obtain a signal (d), and sample holding provides a signal (e) with a height A. In a chart in FIG. 11 showing said value A in the ordinate as a function of the position of the focusing lens group in the abscissa, there is obtained a curve with a peak of which position (B) corresponds to the in-focus position of the focusing lens group.

FIG. 12 is a block diagram in case an inner focus lens shown in FIG. 6 is combined with such an automatic focusing device 12, 13. There are provided a sensor 12, an automatic focusing (AF) circuit 13 for detecting the focus state from the output of the sensor 12, and a motor 14 for axially driving a focusing lens group 4B.

In practice, however, in the structure shown in FIG. 12 it is often difficult to constantly maintain the in-focus state particularly during a zooming operation. This is because the track shown in FIGS. 9 and 10 for focusing to a given object distance cannot be traced due to the movement of the second zooming lens group in the course of the time required by the automatic focusing device 12, 13 to detect the image blur, to determine a front or rear focused state and to determine the direction of rotation of the motor 14.

In consideration of the foregoing, the present applicant already proposed, in the Japanese Patent Application Sho 63-109966, a method of dividing a map indicating the position of the focusing lens group in the ordinate as a function of the focal length in the abscissa, as shown in FIG. 9 or 10, into plural blocks I, II, . . . as shown in FIG. 13, then determining the moving direction and speed of the focusing lens group from the differentiated value of a track passing through the approximate center of each block and the moving speed of the second lens group in the course of the zooming operation, and activating the driving means for the zooming second lens group and that for the focusing lens group at the same time, even if the result of distance measurement is not obtained from the automatic focusing device, thereby preventing the out-of-focus state in the course of a zooming operation.

Also the inner focus lens explained above may become unable to be focused to an object if the focal length is improperly selected, since the shortest focusable distance at the most advanced position of the focusing lens group shown in FIGS. 9 and 10 varies depending on the focal length.

For avoiding such a drawback, the Japanese Laid-open Patent Sho 60-143310 discloses a method of determining, by calculation, whether the distance to the object identified by the automatic focusing device is shorter than the shortest focusable distance at the current focal length, and, if shorter, forcedly moving the zooming lens group toward the wider angle side.

Although such a method is relatively easily practiceable in case the in-focus lens position is predictable from the current position of the focusing lens group, as in the automatic focusing device of the so-called aberration detecting method, but is not applicable to an automatic focusing device capable only of identifying a rear or front focus state or incapable of detecting the exact distance to the object.

Another conceivable method for avoiding such a drawback consists, if an out-of-focus state is encountered at a short object distance, of moving the focusing lens group to the shortest distance position at the current focal length, and, if the out-of-focus state still continues, moving the zooming lens group toward the wider angle side.

However, this method will require a longer time before the in-focus state is reached.

SUMMARY OF THE INVENTION

An aspect of the present invention is to provide a device capable, in case the zooming lens group is positioned at the wider angle side of a predetermined position, of moving the focusing lens group toward the shortest distance position and also moving said zooming lens group toward the wider angle side, thereby significantly reducing the time required for focusing and rendering the change in image angle less conspicuous.

BRIEF DESCRIPTION OF THE DRAWINGS

FIGS. 11A to 11C are schematic views showing the working principle of a common automatic focusing device employed in the present embodiment;

FIG. 14 is a table summarizing focusing trajectories in the first embodiment shown in FIG. 4;

FIG. 15 is a chart showing areas of different motor controls in the first embodiment;

FIG. 16 is a chart showing areas of different motor controls in the divided areas shown in FIG. 13;

FIG. 18 is a chart showing the focusing trajectories in a second embodiment;

FIG. 19 is a chart showing areas of different motor controls in the second embodiment;

FIG. 20 is a table summarizing focusing trajectories in the second embodiment;

FIG. 28 is a flow chart of the control sequence of the fifth embodiment;

DETAILED DESCRIPTION OF THE PREFERRED EMBODIMENTS

Figure 2:
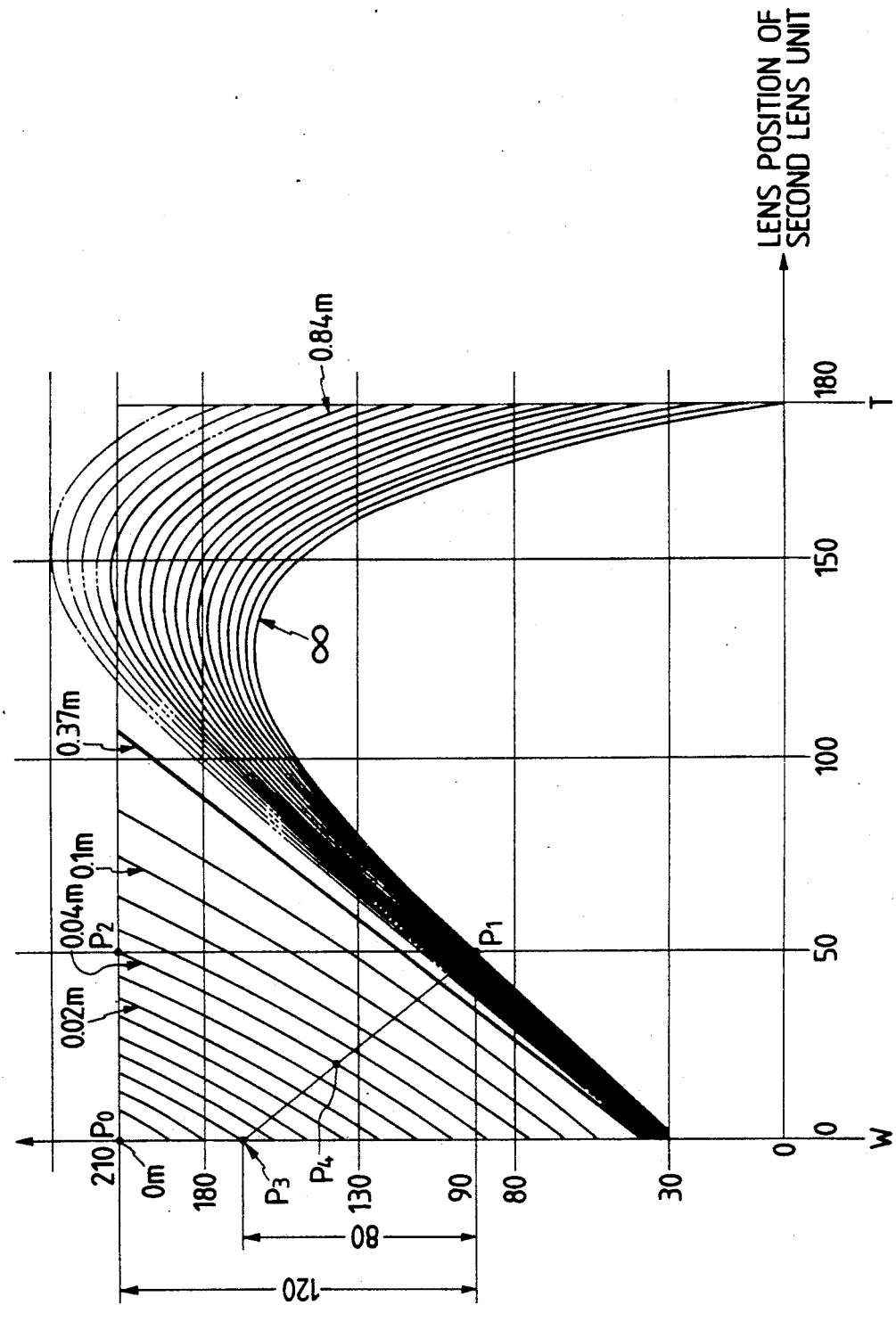
FIG. 2 is a chart showing the relationship for focusing between the zooming lens group and the focusing lens group.

A chart shown in FIG. 2 represents the basic principle of the embodiments of the present invention.

The absolute position of the focusing lens group is made detectable, in positions from 0 to 210 as indicated on the ordinate, by suitable encoder means. Also, the absolute position of the zooming lens group is likewise made detectable, in positions from 0 to 180.

The focusing lens group is assumed to have such a moving speed as to move 210 addresses in 4.2 seconds (50 addresses/sec). Also the zooming speed is assumed, at maximum, to move 180 addresses in 6 seconds (30 addresses/sec).

At first, if the zooming lens group is positioned at an address 50, and if the lens is focused to an object at the infinite distance at such a focal length, the focusing lens group is positioned at a point P1 (address about 90) in FIG. 2. Let us consider a case in which the lens is panned from this state to an object positioned immediately in front of the lens, or in which an object appears immediately in front of the lens. In such a case, the focusing lens group has to be moved forward in response to the detection of a rear-focus state. In the conventional system, the lens group is moved to a point P2 for focusing the lens to a distance of about 0.04 m. The lens movement requires about 2.4 seconds for travelling 120 addresses between P1 and P2. Also in this state, the lens cannot be focused to the object at 0 cm. Thus, while the focusing lens group is maintained at the address 210, the driving source for the zooming lens group is activated to effect zooming toward the wider angle side, whereby the lens is focused to the object immediately in front of the lens when a point P0 is reached. Since the movement from P2 to P0 requires 1.7 seconds, the conventional system requires 4.1 seconds in total for the movement from P1 to P0.

Figure 3:
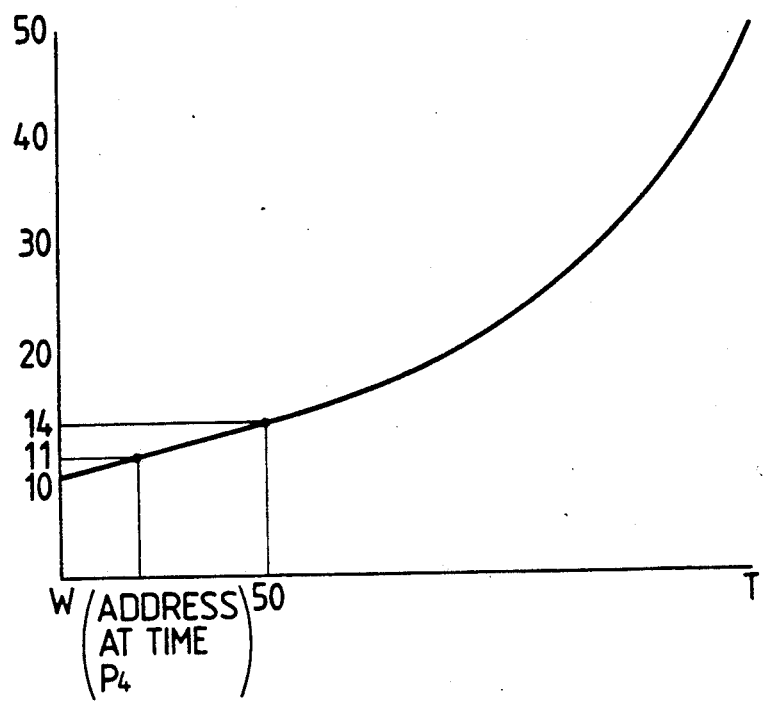
FIG. 3 is a chart showing the relationship between the position of the zooming lens group and the focal length.

On the other hand, the basic approach of said embodiments is to start the movements along the ordinate and the abscissa so as to reach the in-focus state within a shortest time. Consequently, the movement takes place from P1 to P3 and then to P0 within a time of 2.4 seconds, corresponding to a time reduction of 41% in comparison with the movement P1 - P2 - P0. In case of panning of the lens from an object at the infinite distance to another at 0.04 m, the conventional system can bring the lens to the in-focus state without change in the focal length, though the movement from P1 to P2 in 2.4 seconds. On the other hand the embodiment of the present invention involves a change in the focal length, though the focusing to the object distance of 0.04 m at a point P4 can be achieved in about 1 second, corresponding to a time reduction of more than 50%. Consequently, the present invention is not adequate when a change in the focal length is not desirable. However, since the position of the second lens group is correlated with the focal length as shown in FIG. 3, the focal length in practice is 14 and 11 mm respectively at points P1 and P4. Because the change in image angle corresponding to such a small change in the focal length is scarcely noticeable, the reduction in time required for focusing can be considered more advantageous.

The basic approach of the present invention explained above will be clarified in more detail in the following description of preferred embodiments thereof.

Figure 4:
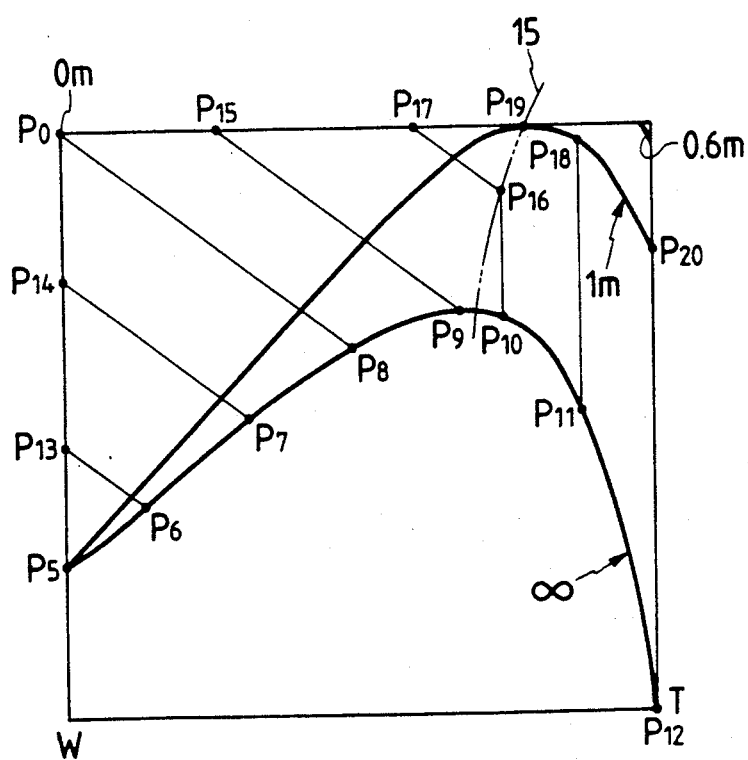
FIG. 4 is a chart showing a focusing trajectory in a first embodiment.

FIG. 4 shows the moving trajectories of the lens as a map in a first embodiment, wherein a line 15 connects points where the differentiated value is zero in trajectories corresponding to various object distances. In the left side of said line 15, the driving source for zooming (hereinafter called the zooming motor) and the driving source for focusing (hereinafter called the focusing motor) are both activated, based on the basic approach explained above, unless the focal length is at the wide angle end or the focusing lens group is in the most advanced position. Such drive results in, for example, the slope of a line connecting points P0 and P8. On the other hand, in the right side of the line 15, the improvement in the focusing speed cannot be obtained if the slope of the line is negative as in the left side of the line 15. On the other hand, if the slope is positive, though the focusing speed can be improved, the focused point is not reached until immediately in front of the lens at the right side of the line 15. Also the change in the image angle is noticeable as the change in focal length is larger. For these reasons, the zooming motor is not activated at the right side of the line 15, and the focusing operation is conducted solely by the focusing motor as in the conventional system.

FIG. 14 summarizes the focusing trajectories to the point P0 (focused to 0 m) from points P5-P12 shown in FIG. 4, representing focused states to the infinite distance at various focal lengths.

FIG. 15 is a similar map as shown before, showing areas of different lens driving methods. In an area 16, the focusing is conducted with the focusing motor and the zooming motor even without the actuation of the zooming button. In an area 17, the focusing is conducted with the focusing motor only, as in the conventional system.

FIG. 16 shows a case in which the encoder for detecting the focal length is designed to provide 12 divisions instead of the finer 180 divisions shown in FIG. 2. In such a case, the boundary line 15 in FIG. 15 assumes a form represented by 37.

Figure 1:
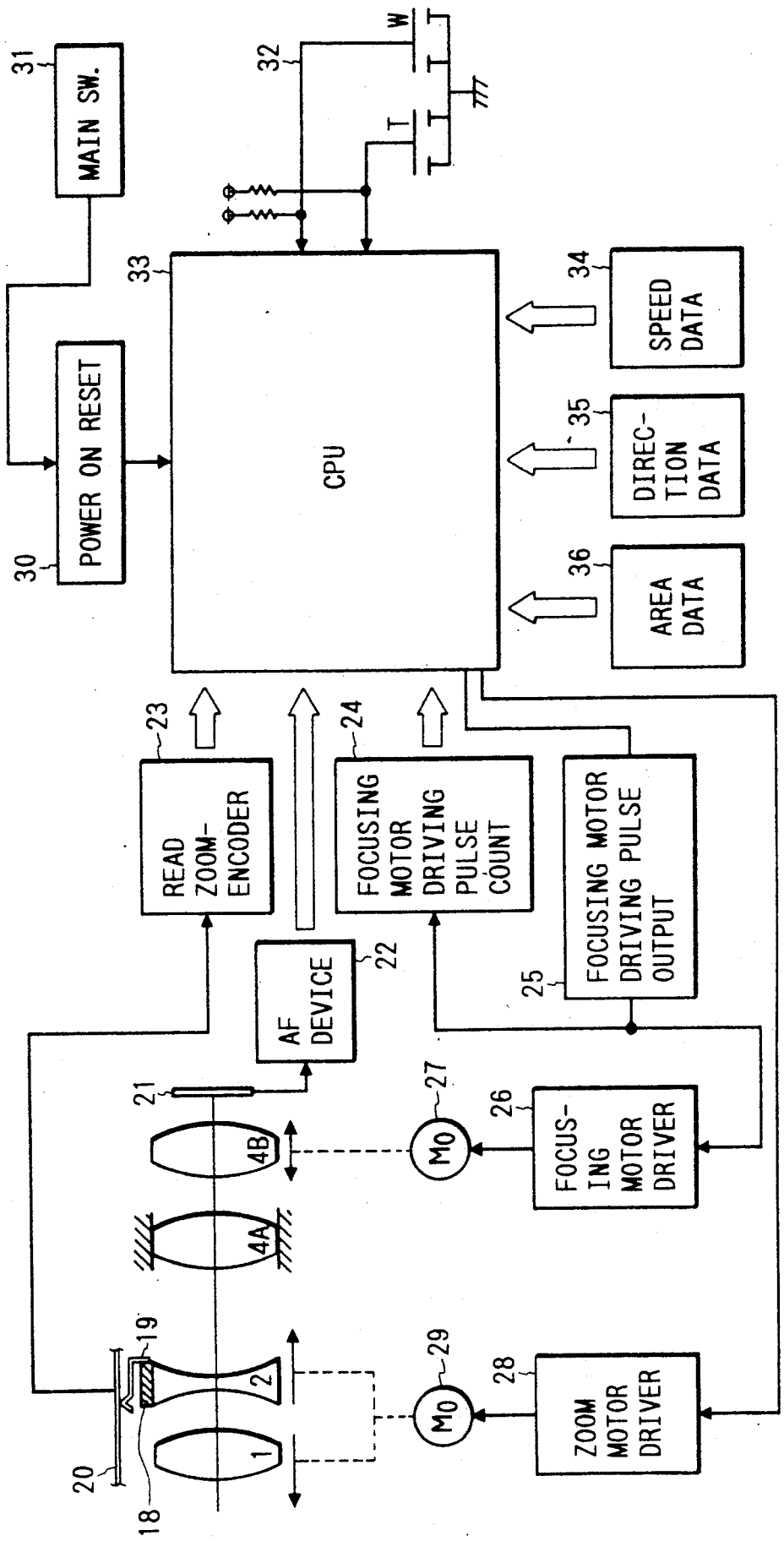
FIG. 1 is a block diagram of the structure of an embodiment of the present invention.
Figure 8:
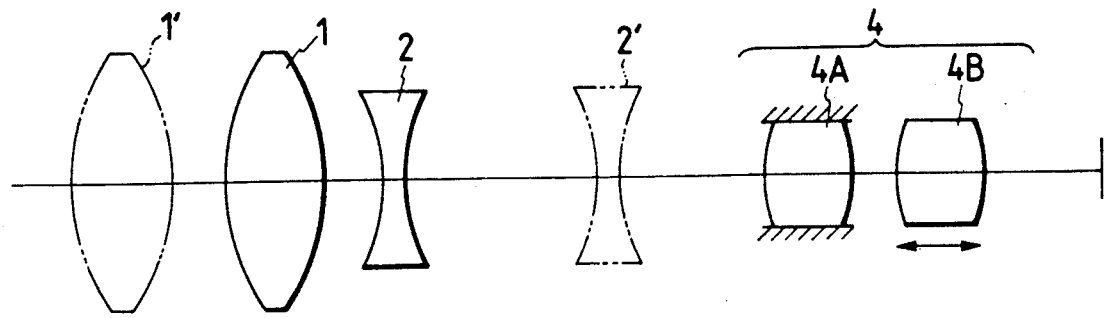
Figure 9:
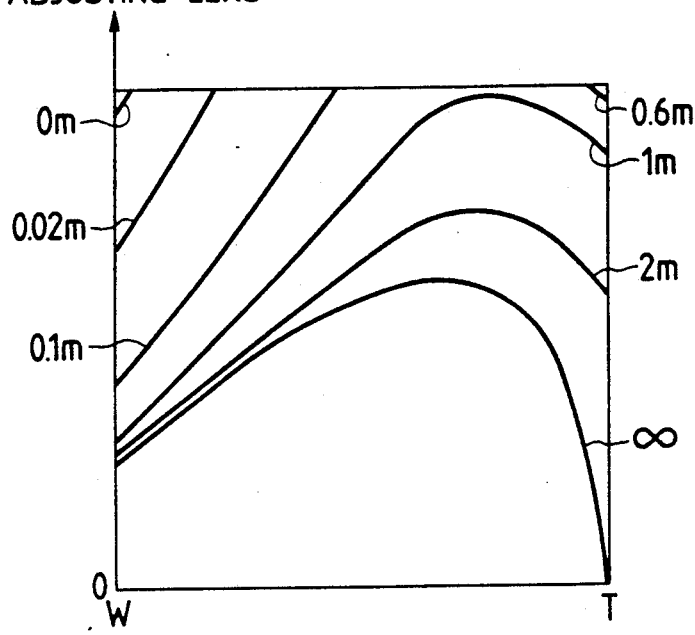
FIG. 9 is a chart showing the characteristics of the lenses shown in FIGS. 6 to 8.
Figure 10:
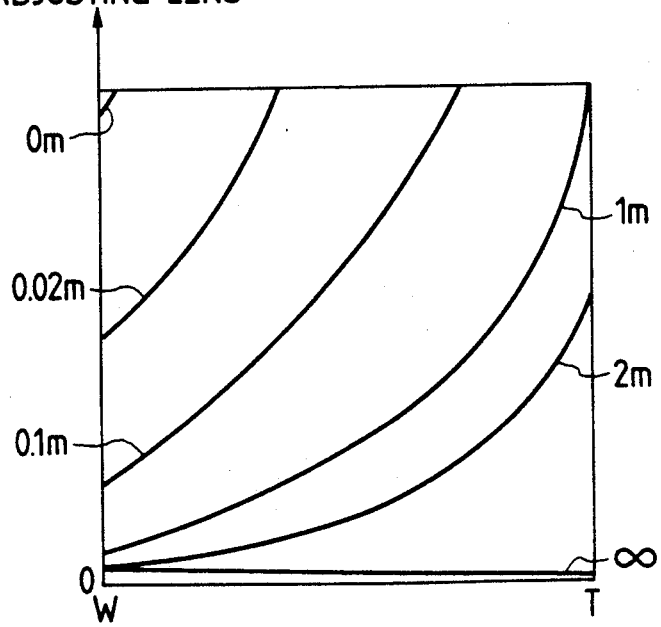
FIG. 10 is a chart showing the characteristics of the lens shown in FIG. 5.

FIG. 1 is a block diagram of the present embodiment, employing a lens type shown in FIG. 8, in which the first lens group 1 and the second lens group 2 are moved in the zooming operation. A zoom encoder for detecting the focal length (or position of the zooming lens) is composed of a frame 18 for the second lens group 2, a brush 19 mounted integrally on said frame 18, and an encoder base plate 20. A zoom encoder reading circuit 23 sends the result of detection to a CPU 33. In the present embodiment there is employed an encoder in which the brush 19 slides over a resistance pattern or a gray code pattern formed on the base plate 20, but encoders of other types may likewise be employed.

Figure 11A:
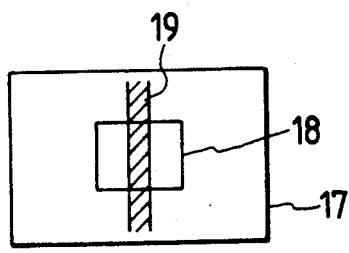
Figure 13:
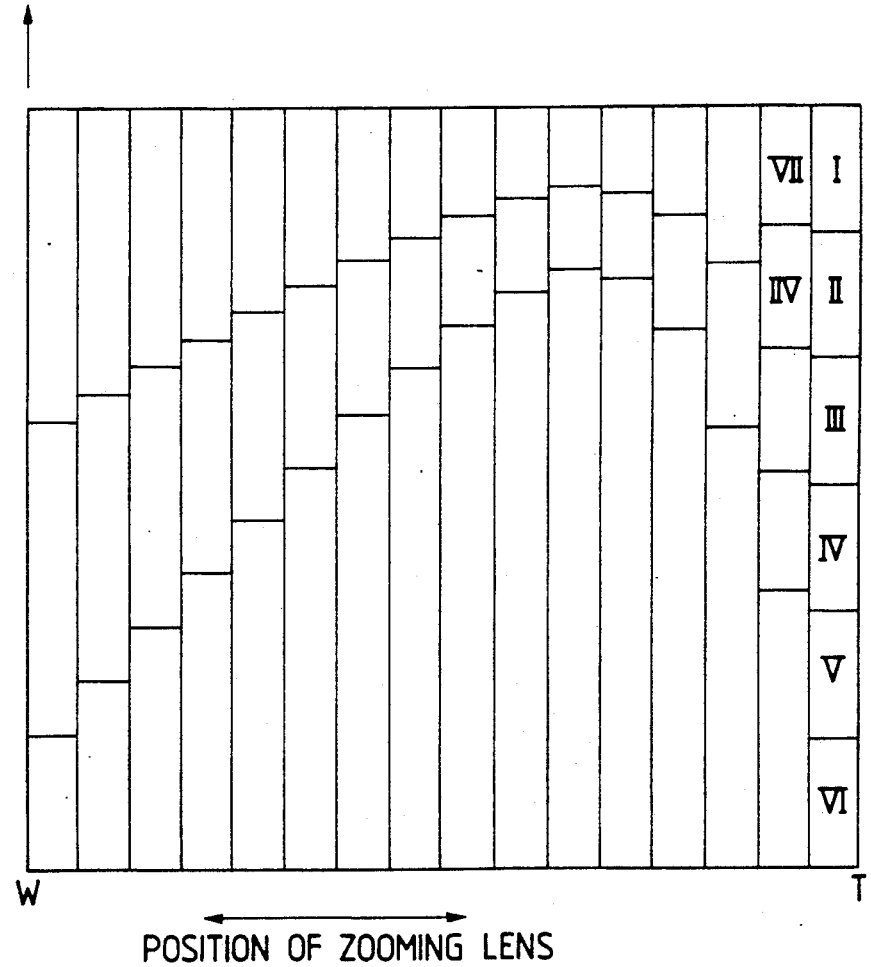
FIG. 13 is a chart showing an example of area division in case of a small number of division by a zoom encoder.

There are also provided an image pickup 21 such as a CCD; an automatic focusing device 22 for determining the value A in case of the method shown in the FIG. 11, utilizing the luminance component of the image signal, and sending the result to the CPU 33; an output circuit 25 of driving pulses for a focusing motor 27 according to the instruction of the CPU 33; a driver 26; a focusing motor 27 consisting of a stepping motor; and a counting circuit 24 for the driving pulses for the focusing motor 27, constituting an encoder for determining the absolute position of the focusing lens group. For detecting the absolute position by the number of steps, a power-on resetting circuit 30 moves the focusing lens group 4B to a predetermined position in response to the closing of a main switch 31, and the number of steps is reset to zero at said predetermined position A driver 28 serves to drive a zooming motor 29, according to the instruction of the CPU 33. Zooming switches 32 are composed of a switch W toward the wide angle side and another switch T toward the telephoto side. Data 34-36 are used for determining the driving speed and direction of the focusing motor 27 in the course of a zooming operation as explained before. The areas I, II, . . . shown in FIG. 13 are identified from the result of detection by the zoom encoder and the number of steps, and the driving direction of the focusing motor 27 is from the direction data 35, based on the state of the zoom switches 32 and the information on said area. Also, the driving speed is determined from the speed data 34.

In the conventional system, when the zoom switches are not actuated, the CPU determines the driving direction and speed of the focusing motor according to the result of detection by the automatic focusing device, and releases driving pulses thereby driving the focusing motor through the driver. On the other hand, in the present embodiment, even when the zoom switches are not actuated, the CPU determines whether the lens is in the area 16 or 17 in FIG. 15, according to the output of the zoom encoder and the number of steps. In case of the area 16, the zooming motor 29 and the focusing motor 27 are both activated according to the result of detection by the automatic focusing device 22.

Figure 17:
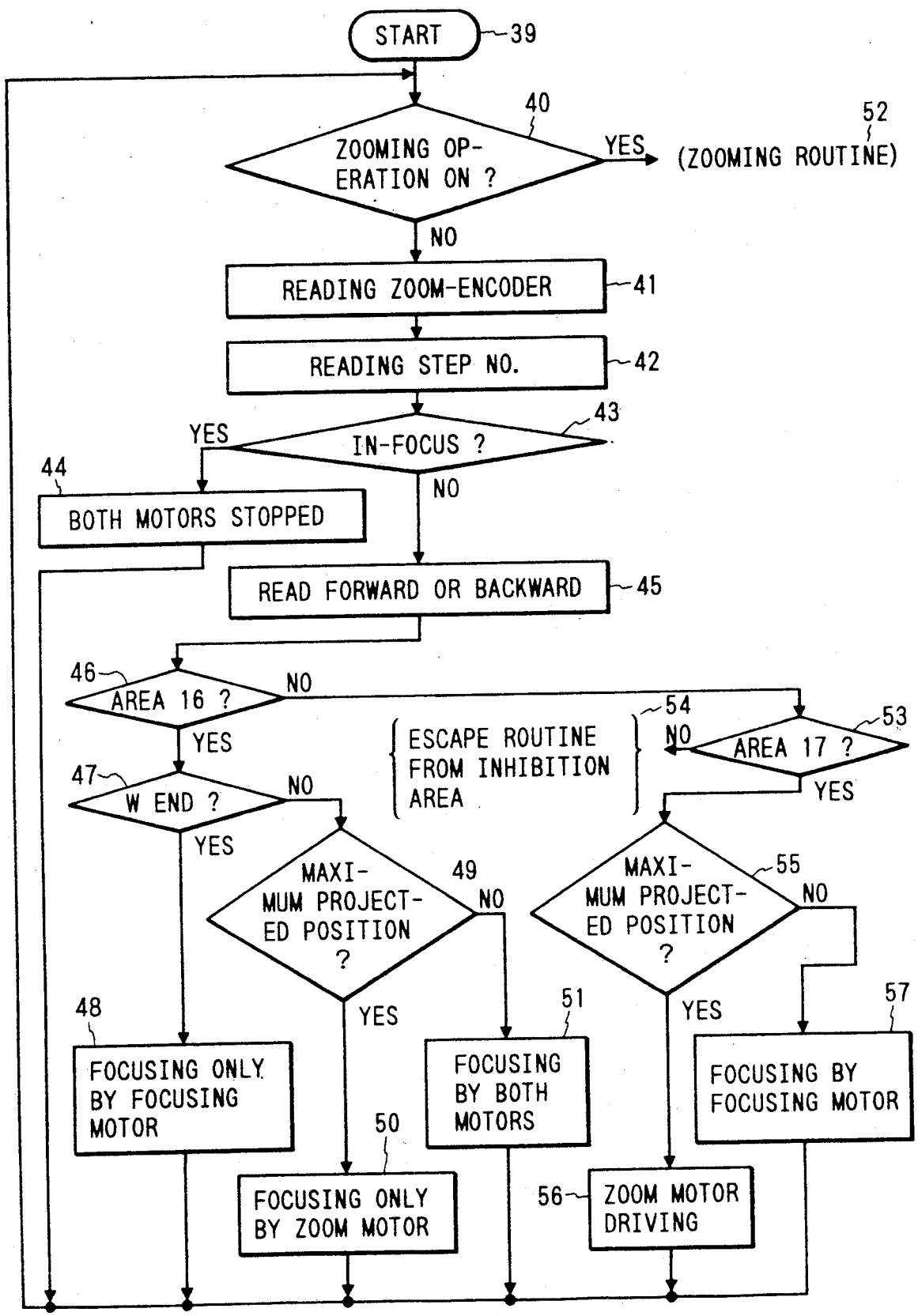
FIG. 17 is a flow chart of the control sequence of the first embodiment.

FIG. 17 is a flow chart of the first embodiment, for selecting the motors to be employed in the focusing. The control sequence starts in a step 39, an a step 40 discriminates whether the zooming switches 32 shown in FIG. 1 are actuated, and, if a zooming operation is selected, the sequence jumps to a zooming routine 52, disclosed for example in the Japanese Patent Application Sho 63-109966 of the present applicant. If the zooming operation is not conducted, a step 41 reads the value of the zoom encoder. Then a step 42 reads the number of steps of the focusing motor, representing the absolute position of the focusing lens group 4B. A next step 43 discriminates the in-focus or out-of-focus state using the automatic focusing device 22. If an in-focus state is identified, a step 44 stops both the zooming motor 29 and the focusing motor 27. In case of an out-of-focus state, a step 45 discriminates whether the lens is front or rear focused. The driving directions of both motors are determined from the result of said step and the position in the map determined from the steps 41, 42. In the following explanation the lens is assumed to be front focused. A step 46 discriminates whether the current lens position is in the area 16 or 17 in FIG. 15, and, in case of the area 16, a step 47 discriminates whether the lens is at the wide angle end, and a step 49 discriminates whether the lens is at the fully advanced position. Based on the results of said discriminations, the focusing is conducted by the focusing motor 27 only, the zooming motor 29 only or both motors in a step 48, 50 or 51. Said fully advanced position of the lens is stored, as a number of steps, in the CPU 33, and is identified by the comparison of the current number of steps with said stored number. The wide angle end position in zooming is identified by the zoom encoder.

A step 53 then discriminates whether the lens is in the area 17. If not, the lens is in an inhibited area such as an ex-infinity area (hatched area in FIG. 15), from which the lens has to escape by a step 54 though the details will not be explained.

Then a step 55 discriminates whether the focusing lens group is at the fully advanced position, and, if so, a step 56 activates the zooming motor 29. If not, a step 57 executes focusing with the focusing motor only.

In the structure explained above:

(A) The lens can be focused to an object immediately in front of the lens, regardless of the focal length of the lens, when it is focused to the infinite object distance;

(B) The time required for focusing can be significantly reduced; and (C) The intention of the photographer is seldom betrayed since the change in image angle is limited.

[2nd embodiment]

In the following there will be explained an embodiment employing a lens system shown in FIG. 5. In this case the areas can be divided in a simple manner in consideration of the change in image angle. As shown in FIGS. 18 and 19, the line 15' can be defined at a fixed value, and the areas 16' and 17' can be defined respectively at the wide angle side and at the telephoto side.

Figure 5:
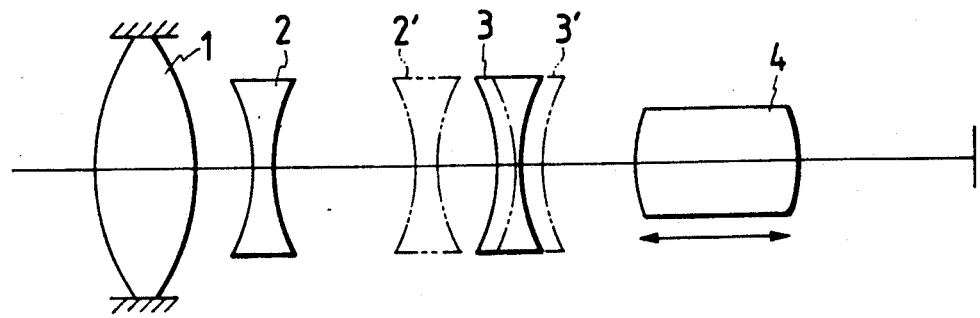
FIGS. 5 to 8 are views illustrating optical systems of the lenses of inner focus type.

Now reference is made to FIGS. 18 and 20 for explaining the driving control for the zooming motor 29, for axially moving the second lens group 2 and the third lens group 3 in FIG. 5, and the focusing motor 27, for axially moving the fourth lens group 4 shown in FIG. 5.

In the following there will be explained a case of moving the focusing lens group 4 from a state focused to the infinite object distance to a state focused to 0 m. In short, in the area 16', the focusing motor 27 and the zooming motor 29 are both activated even in the absence of the zooming operation, but, in the area 17', the focusing motor 27 is alone activated until the lens is focused to the shortest object distance.

For example, if the lens starts from a point P6 for focusing to an object at 0 m, both motors are at first driven to a point P13, and then the focusing motor 27 is driven alone to the point P0. If the lens starts from a point P8, both motors 27, 29 are driven to the point P0.

On the other hand, if the lens starts from a point P11 in the area 17' for focusing to an object at 0 m, the focusing motor 27 is driven alone at first to a point P17, and then the zooming motor 29 is alone driven to the point P0 through points P16 and P15.

Also when the lens starts from a non-infinite distance position, the motors 27, 29 are selectively driven according to the area 16' or 17'.

The block diagram of this second embodiment is the same as that of the first embodiment, except that the focusing motor 27 drives the 4th lens group 4 in FIG. 5 and the zooming motor 29 drives the 2nd and 3rd lens groups 2, 3 in FIG. 5.

Figure 21:
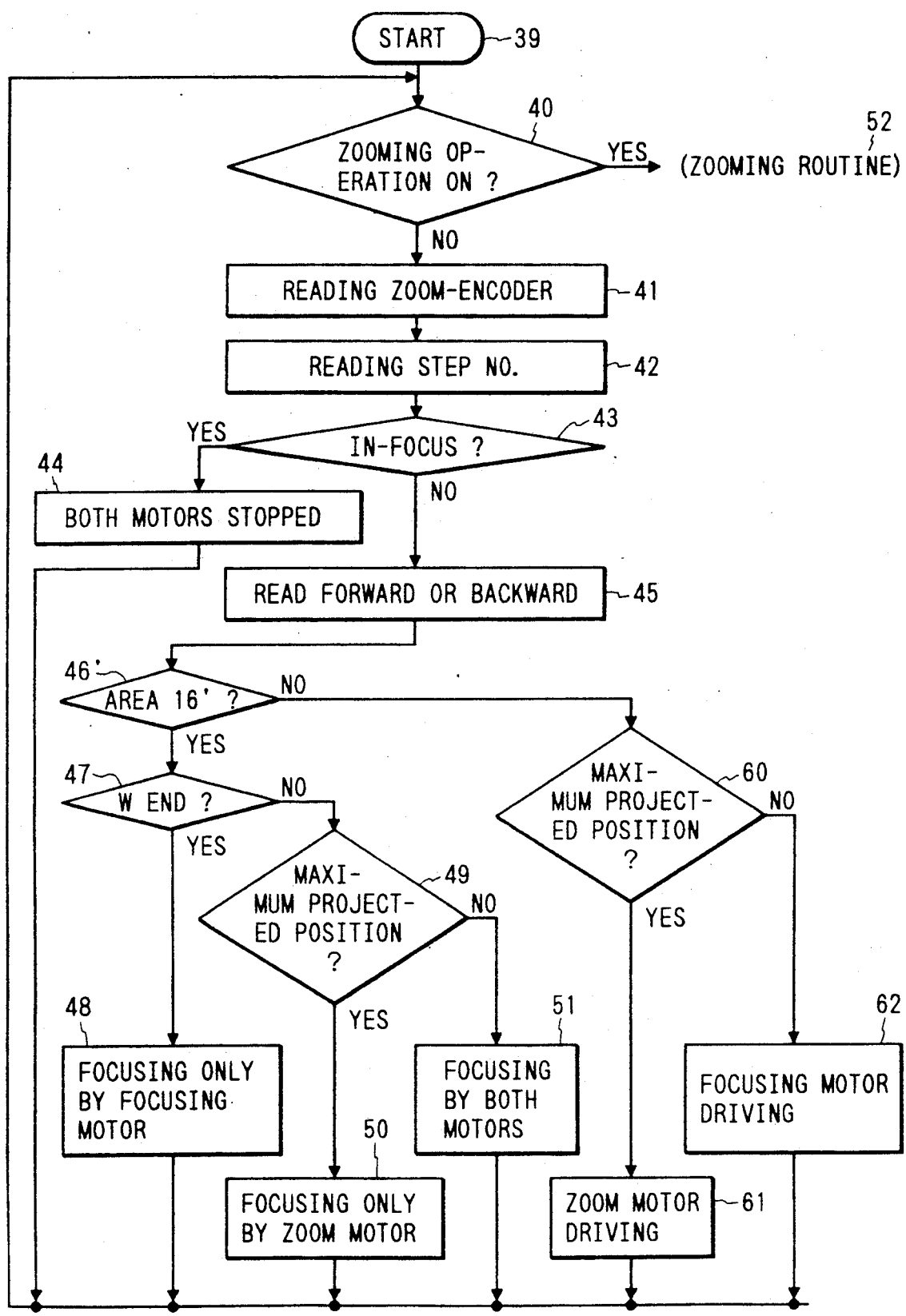
FIG. 21 is a flow chart of the control sequence of the second embodiment.

However the flow chart of the control sequence is partly modified as shown in FIG. 21, in which steps different from those in FIG. 17 are represented by different numbers. A step 46' discriminates whether the lens is in the area 16' or 17' shown in FIG. 19. In case of the area 16', the sequence proceeds to a step 47 for effecting an operation similar to that in the 1st embodiment, but, in case of the area 17', the sequence proceeds to a step 60, for discriminating whether the focusing lens group is at the fully advanced position. If so, the sequence proceeds to a step 61 for driving the zooming motor 29 alone, but, if not, a step 62 drives the focusing motor 27 alone for focusing.

[3rd embodiment]

Figure 22:
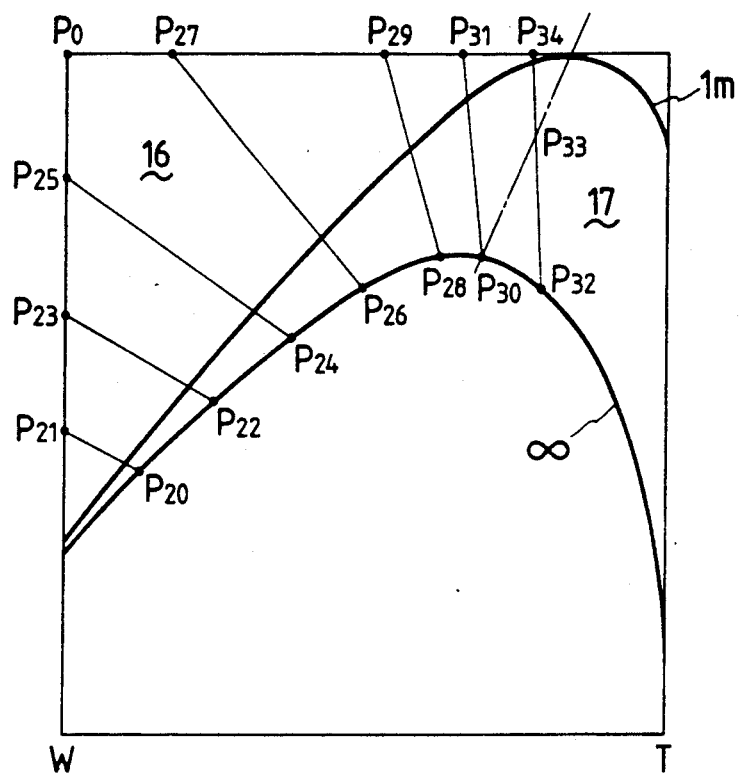
FIG. 22 is a chart showing the focusing trajectories in a third embodiment.

A 3rd embodiment shown in FIG. 22 aims at limiting the change in image angle to a certain rate in the control of the motors 27, 29 in the area 16. For this purpose the speed ratio of the focusing motor 27 and the zooming motor 29 is varied according to the position of the lens groups. Referring to FIG. 22, the speed ratio of the zooming motor 29 to the focusing motor 27 is selected differently according to whether the zooming lens group (the same as in the 1st embodiment) starts from an infinite distance position P20 or P26. More specifically, the zooming motor 29 is driven faster in case the lens group starts from the position P20 closer to the wide angle end than the position P26. Stated differently, at the point P26 closer to the telephoto end, the zooming lens group is driven with a lower speed rate since a large movement of the zooming lens group causes a large change in the focal length as shown in FIG. 3, thus resulting in a significant change in the image angle. Examples of movement of the lens group from points P20, P22, P24, P26, P28 and P30 are represented by lines P20 P21, P22 P23, P24 P25, P26 P27, P28 P29 and P30 P31, so that the difference in the speed ratio of the focusing motor 27 and the zooming motor 29 will be apparent from the difference in the slope of said lines.

The concept of the present 3rd embodiment is applicable also to the lens system shown in FIG. 5.

In case the focusing operation is conducted by the focusing motor 27 and the zooming motor 29 in the area 16 in the foregoing 1st to 3rd embodiments, said motors may be driven simultaneously (parallel drive) or alternately by a unit amount at a time (serial drive). Either method may be selected suitably in consideration of the capacity of the power supply and the ability of the CPU.

The motors 27, 29 are preferably driven at maximum possible speeds thereof.

The foregoing embodiments are featured by a significant reduction in the time required for focusing, in comparison with the conventional method, by moving the zooming lens group also in the focusing operation. Also the control of said zooming lens group is selectively conducted according to the position of said zooming lens group, whereby the change in the image angle in the focusing operation can be limited within a certain range, thus conforming to the intention of the photographer.

The automatic focusing device of the foregoing embodiments (cf. FIG. 1) need not be capable of calculating the amount of defocus or the distance to the object at the focusing operation but can merely be capable of discriminating whether the lens is front or rear focused. Even with such an automatic focusing device, the foregoing embodiments can reduce the time required for bringing the lens from an initial focused state to a state focused to a very short distance (for example 1, 0.5 or 0 m). More specifically, the focusing time can be reduced even in case the focusing can be achieved without the movement of the zooming lens group, such as a focusing operation of the lens from a state focused to the infinite distance to an object of about 1 m (for example a case of lens movement from a point P8 in FIG. 4 to the focus line of 1 m). Also the focusing time can be reduced even in case the focusing can only be achieved involving the movement of the zooming lens group, such as a focusing operation to an object of 0 m (for example a case of lens movement in FIG. 4 from a point P7 to P0 through P14, or from a point P9 to P0 through P15).

[4th Embodiment]

Figure 23:
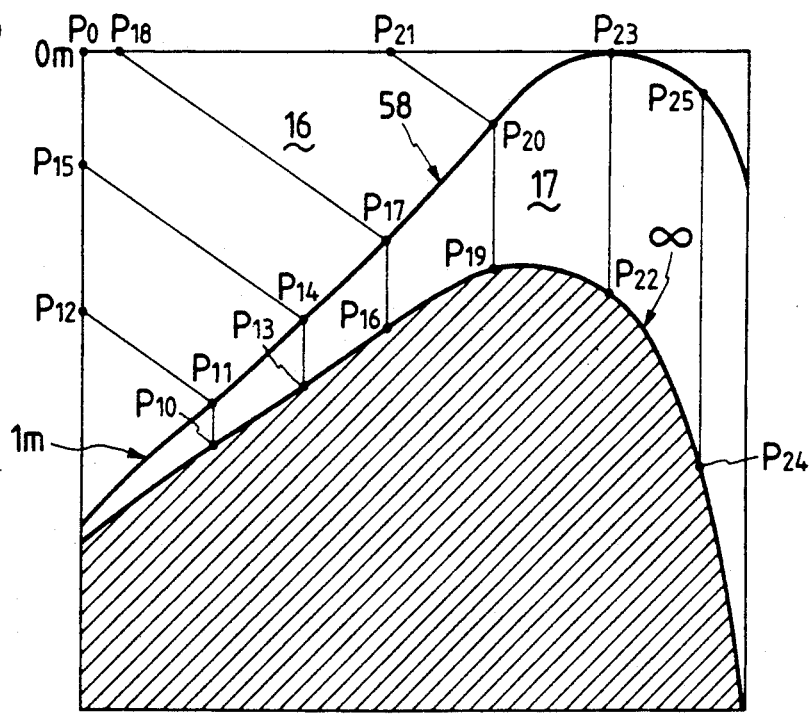
FIG. 23 is a chart showing the focusing trajectories in a fourth embodiment.

FIG. 23 shows trajectories of lens movement in a 4th embodiment.

In most of the conventional 4-group zoom lenses, the shortest focusable distance is about 1 m, and any shorter distance belongs to the so-called macro photographing area. In consideration of this fact, the area 16 employing the zooming motor and the focusing motor for focusing and the area 17 employing the focusing motor only are divided as shown in FIG. 4, wherein said area 17, in which the focusing is conducted by the focusing motor only, is defined between a line of infinite distance and a line 58 corresponding to the distance of 1 m. Thus, the focusing operation between 1 m and infinite distance does not involve a change in the focal length. In this case, the upper limit of the area 17 is defined by said line of 1 m, because, as shown in FIG. 23, the lens can be focused to the object at 1 m at any focal length.

As an example, if the lens focused to the infinite distance at a point P13 is focused to an object just in front of the lens, the lens movement follows a trajectory of P13 - P14 - P15 - P0.

In the present 4th embodiment, as explained above, the areas 16 and 17 are divided by a line 58, whereby a time reduction of 41% is achievable in reaching the point P0, within a range from the infinite distance to a distance defined by said line 58 (1 m in case of FIG. 23). However, in case of lens panning from an object at infinite distance to another object at 0.04 m, the conventional system can reach the focused state without involving a change in the focal length, though the focusing operation requires 2.4 seconds. On the other hand, the method of the present embodiment involves a change in the focal length, though the focusing operation to a point P4 at 0.04 m requires about 1 second, corresponding to a time reduction in excess of 50%. Consequently, the present invention is not adequate when a change in the focal length is not desirable. However, since the position of the second lens group is correlated with the focal length as shown in FIG. 3, the focal length in practice is 14 and 11 mm respectively at points P1 and P4. Because the change in image angle corresponding to such a small change in the focal length is scarcely noticeable, the reduction in time required for focusing can be considered more advantageous.

Figures 24, 25:
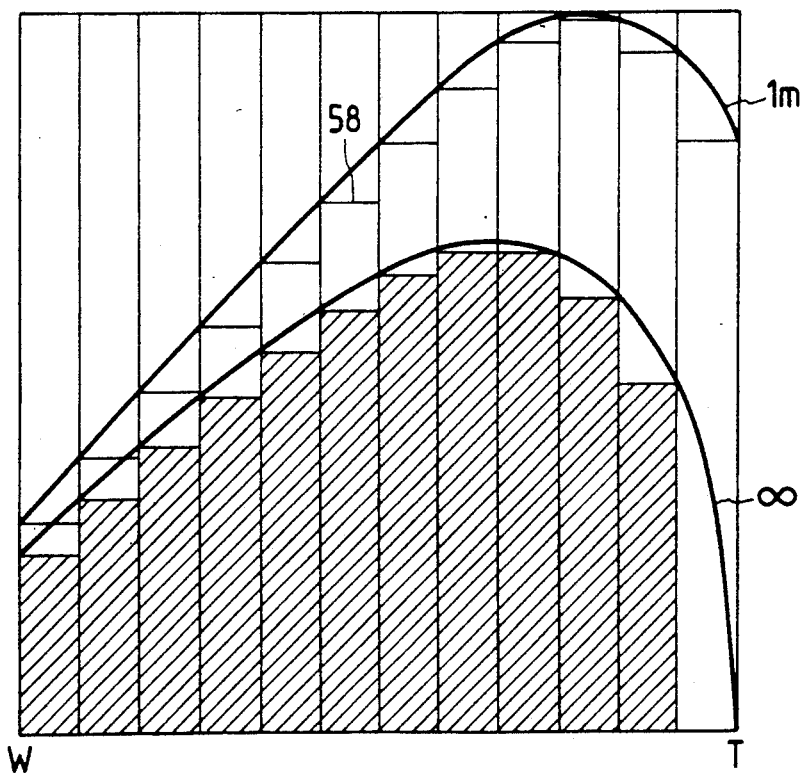
FIG. 24 is a table summarizing focusing trajectories in the fourth embodiment shown in FIG. 23.
FIG. 25 is a chart showing areas of different motor controls in the divided areas shown in FIG. 13.

FIG. 24 summarizes the moving trajectories of the lens in the 4th embodiment.

FIG. 24 shows the trajectories from certain infinite distance points P10, P13, P16, P19, P22 and P24 at different focal lengths, as shown in FIG. 23, to a point P0 focused to 0 m. For example, in case of focusing the lens, initially focused to the infinite distance at the point P16, to an object at 0 m, the focusing motor alone is at first driven to the 1 m line. Then, the focusing motor and the zooming motor are both activated to a point P18, where the focusing lens group reaches the shortest distance end, and the zooming motor alone is thereafter driven to reach the point P0.

FIG. 25 shows a case in which the encoder for detecting the focal length is designed to provide 12 divisions instead of the finer 180 divisions as shown in FIG. 2. In such a case, the boundary line 58 in FIG. 24 assumes a form represented by 58'.

Figure 26:
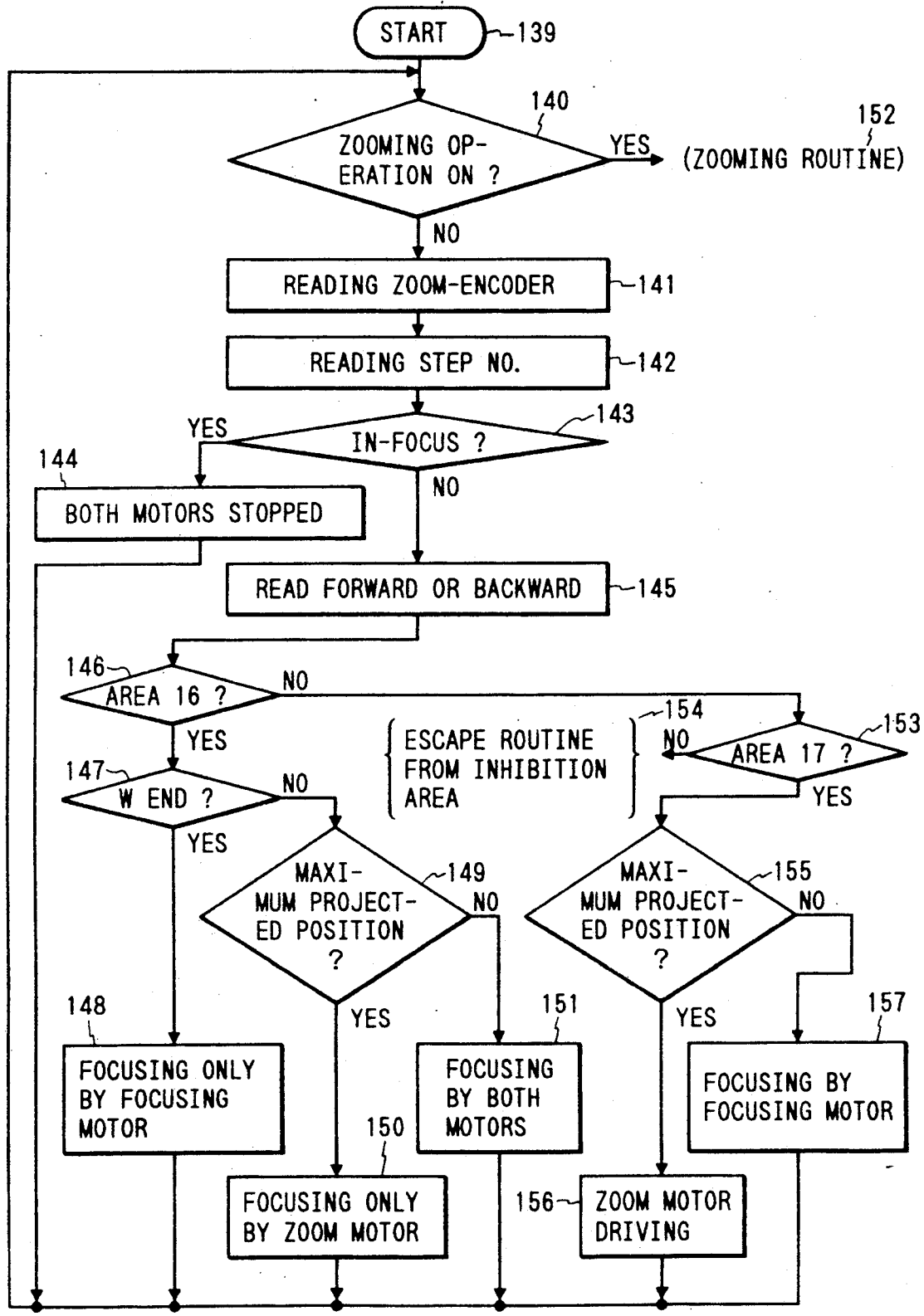
FIG. 26 is a flow chart of the control sequence of the fourth embodiment.

FIG. 26 is a flow chart of the 4th embodiment, for selecting the motors to be employed in the focusing. The control sequence starts in a step 139, and a step 140 discriminates whether the zooming switches 32 shown in FIG. 1 are actuated, and, if a zooming operation is selected, the sequence jumps to a zooming routine 152, disclosed for example in the Japanese Patent Application Sho 63-109966 of the assignee of the present present applicants. If the zooming operation is not conducted, a step 141 reads the value of the zoom encoder. Then, a step 142 reads the number of steps of the focusing motor, representing the absolute position of the focusing lens group 4B. A next step 143 discriminates the in-focus or out-of-focus state using the automatic focusing device 22. If an in-focus state is identified, a step 144 stops both the zooming motor 29 and the focusing motor 27. In case of an out-of-focus state, a step 145 discriminates whether the lens is front or rear focused. The driving directions of both motors are determined from the result of said step and the position in the map determined from the steps 141, 142. In the following explanation the lens is assumed to be front focused. A step 146 discriminates whether the current lens position is in the area 16 or 17 in FIG. 23, and, in case of the area 16, a step 147 discriminates whether the lens is at the wide angle end position, and a step 149 discriminates whether the lens is at the fully advanced position. Based on the results of said discriminations, the focusing is conducted either by the focusing motor 27 only, the zooming motor 29 only or both motors, in a step 148, 150 or 151. Said fully advanced position of the lens is stored, as a number of steps, in the CPU 33, and is identified by the comparison of the current number of steps with said stored number. The wide angle end position in zooming is identified by the zoom encoder.

A step 153 then discriminates whether the lens is in the area 17. If not, the lens is in an inhibited area such as an ex-infinity area (hatched area in FIG. 23), from which the lens has to escape by a step 154, though the details of said step will not be explained.

Then a step 155 discriminates whether the focusing lens group is at the fully advanced position, and, if so, a step 156 activates the zooming motor 29 to enter the area 16. On the other hand, if not, a step 157 executes focusing with the focusing motor only.

In the structure explained above:

(A) The lens can be focused to an object immediately in front of the lens, regardless of the focal length of the lens when it is focused to the infinite object distance;

(B) The time required for focusing can be significantly reduced; and (C) The intention of the photographer is seldom betrayed since the focusing operation is conducted by the focusing motor only as in the conventional system to the shortest object distance in the normal photographing area (for example 1 m), and the focusing motor and the zooming motor are both used only for an object at a very short distance.

[5th embodiment]

In the following there will be explained an embodiment employing a lens system shown in FIG. 5. In this case the basic concept of motor control is the same as in the 4th embodiment, except that the line 58, connecting points focused to 1 m at various focal lengths, is different from that shown in FIG. 23.

Figure 27:
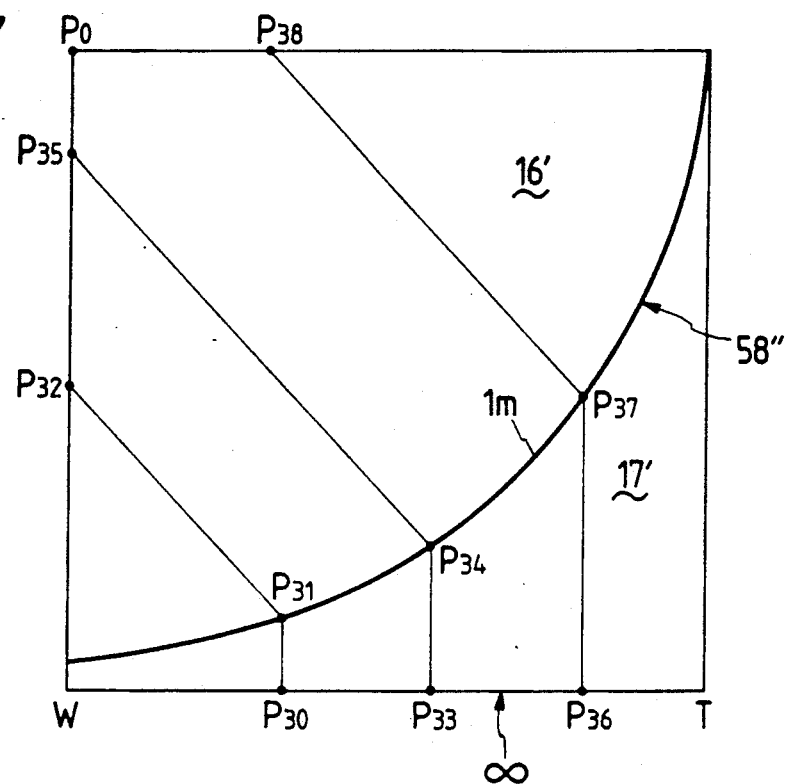
FIG. 27 is a chart showing the focusing trajectories of a fifth embodiment.

More specifically, as shown in FIG. 27, the focusing is conducted by the focusing motor alone from the infinite distance position to said line corresponding to the focused state to 1 m, and then by the focusing motor and the zooming motor for an object at an even shorter distance.

For example, in case of a focusing operation from an infinite distance point P33 to an object at 0 m, the focusing motor alone is driven to a 1 m distance point P34, then the focusing motor and the zooming motor are both driven to a point P35 at the wide angle end, and the focusing motor alone is finally driven to the point P0 focused to 0 m.

Also when the lens starts from a non-infinite distance point, the motors are selectively driven according to the areas 16' and 17'.

The block diagram of this 5th embodiment is the same as that shown in FIG. 1, except that the focusing motor 27 drives the 4th lens group 4 in FIG. 5, and the zooming motor 29 drives the 2nd and 3rd lens groups 2, 3 in FIG. 5.

However the flow chart of the control sequence is partly modified as shown in FIG. 28, in which steps different from those in FIG. 26 are represented by different numbers. A step 146' discriminates whether the lens is in the area 16' or 17' shown in FIG. 27. In case of the area 16', the sequence proceeds to a step 147 for effecting an operation similar to that in the 4th embodiment, but, in case of the area 17', the sequence proceeds to a step 160 for focusing with the focusing motor 27 only.

[6th embodiment]

Figure 29:
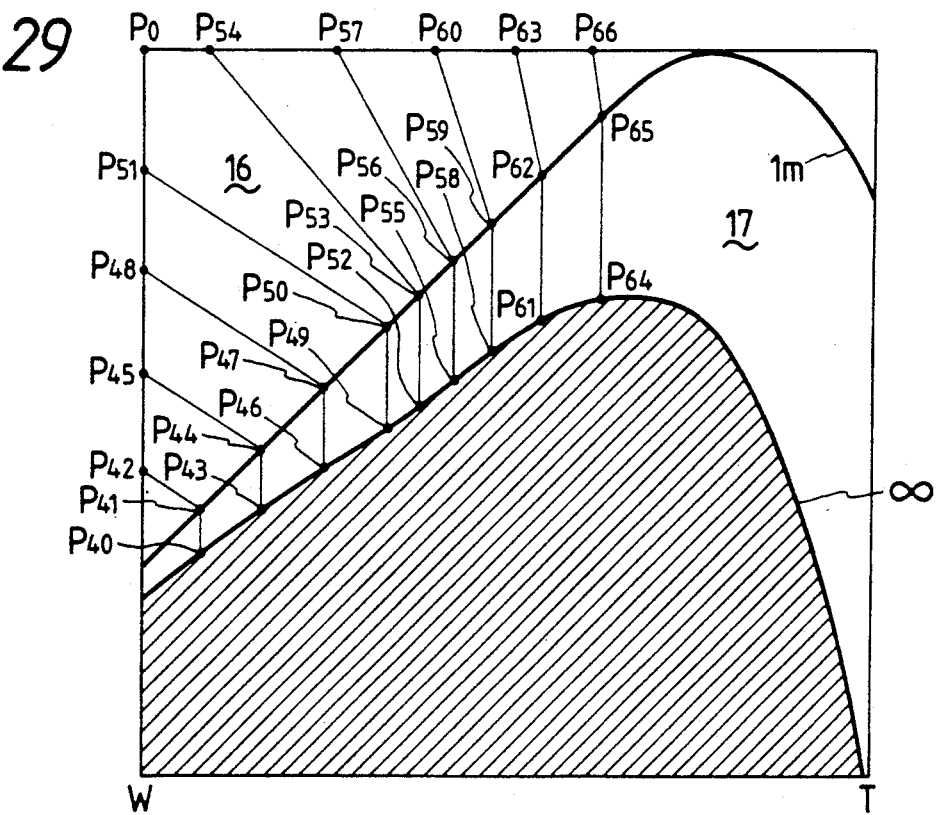
FIG. 29 is a chart showing focusing trajectories of a sixth embodiment.
Figure 30:
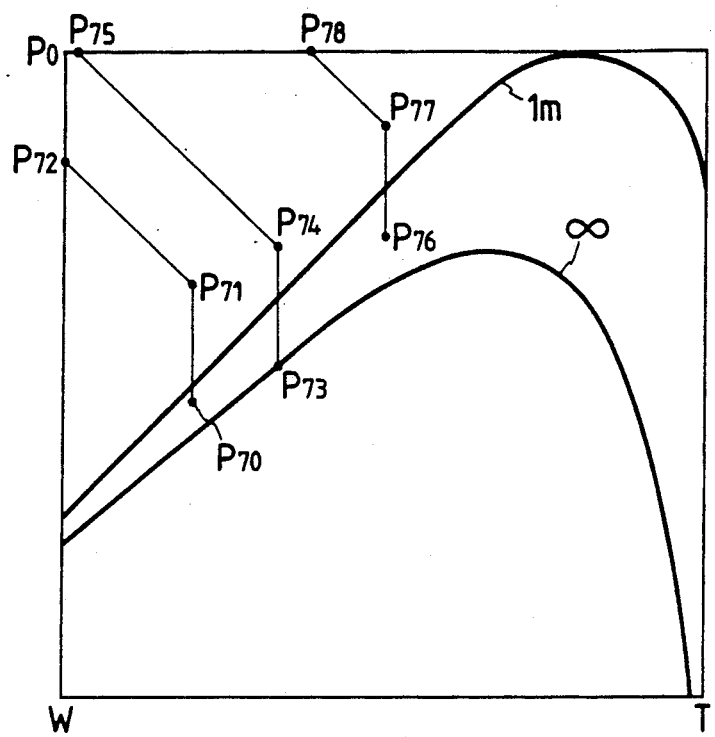
FIG. 30 is a chart showing focusing trajectories of a seventh embodiment.

A 6th embodiment shown in FIG. 29 aims at limiting the change in image angle to a certain rate in the control of the motors 27, 29 in the area 16. For this purpose the speed ratio of the focusing motor 27 and the zooming motor 29 is varied according to the position of the lens groups. Referring to FIG. 29, the speed ratio of the zooming motor 29 to the focusing motor 27 is selected differently according to whether the zooming lens group (assumed to be the same as in the 1st embodiment) starts from an infinite distance position P41 or P56. More specifically, the zooming motor 29 is driven faster in case the lens group starts from the point P41 closer to the wide angle end than the point P56. Stated differently, at the point P56 closer to the telephoto end, the zooming lens group is driven with a lower speed rate since a large movement of the zooming lens group causes a large change in the focal length as shown in FIG. 3, thus resulting in a significant change in the image angle. Examples of movement of the lens group from points P40, P43, P46, P49, P52, P55, P58, P61 and P64 are represented by lines P40 P41 P42, P43 P44 P45, ..., P61 P62 P63 and P64 P65 P66, so that the difference in the speed ratio of the focusing motor 27 and the zooming motor 29 will be apparent from the difference in the slope of said lines.

The concept of the present 6th embodiment is applicable also to the lens system shown in FIG. 5.

[7th embodiment]

A 7th embodiment is featured by the fact that the switching from the drive with the focusing motor only to the drive with the focusing motor and the zooming motor is determined by time. In the foregoing 4th to 6th embodiments, said switching of motor control is determined by the position of the focusing lens group, for example the position focused to 1 m. However, in the present 7th embodiment, the focusing operation by the focusing motor and the zooming motor is conducted if an in-focus state is not reached within a predetermined time by the focusing with the focusing motor only.

The object distance in the normal situation is frequently about 2 m, and an effect comparable to that in the foregoing 4th to 6th embodiments can be obtained by selecting a period of 4 to 6 seconds for the drive with the focusing motor only, in consideration of a situation in which the object at 2 meters mentioned above has moved to a shorter distance, for example 1 m.

Figure 6:
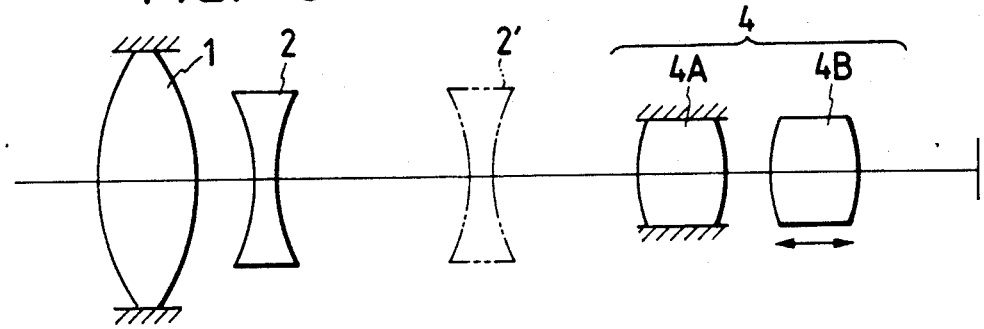
Figure 7:
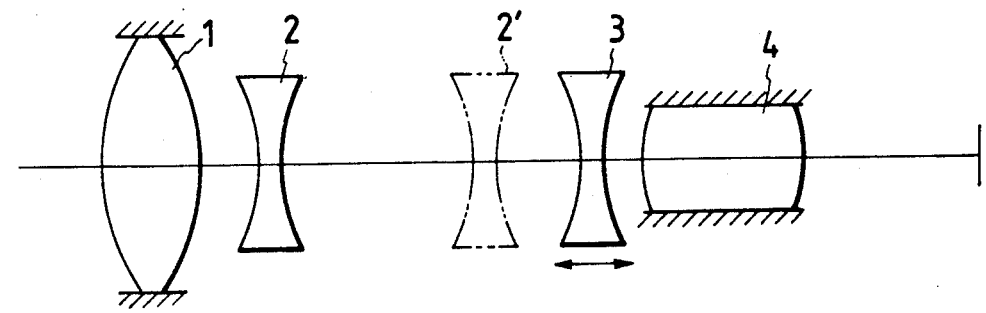
Figures 31, 31A:
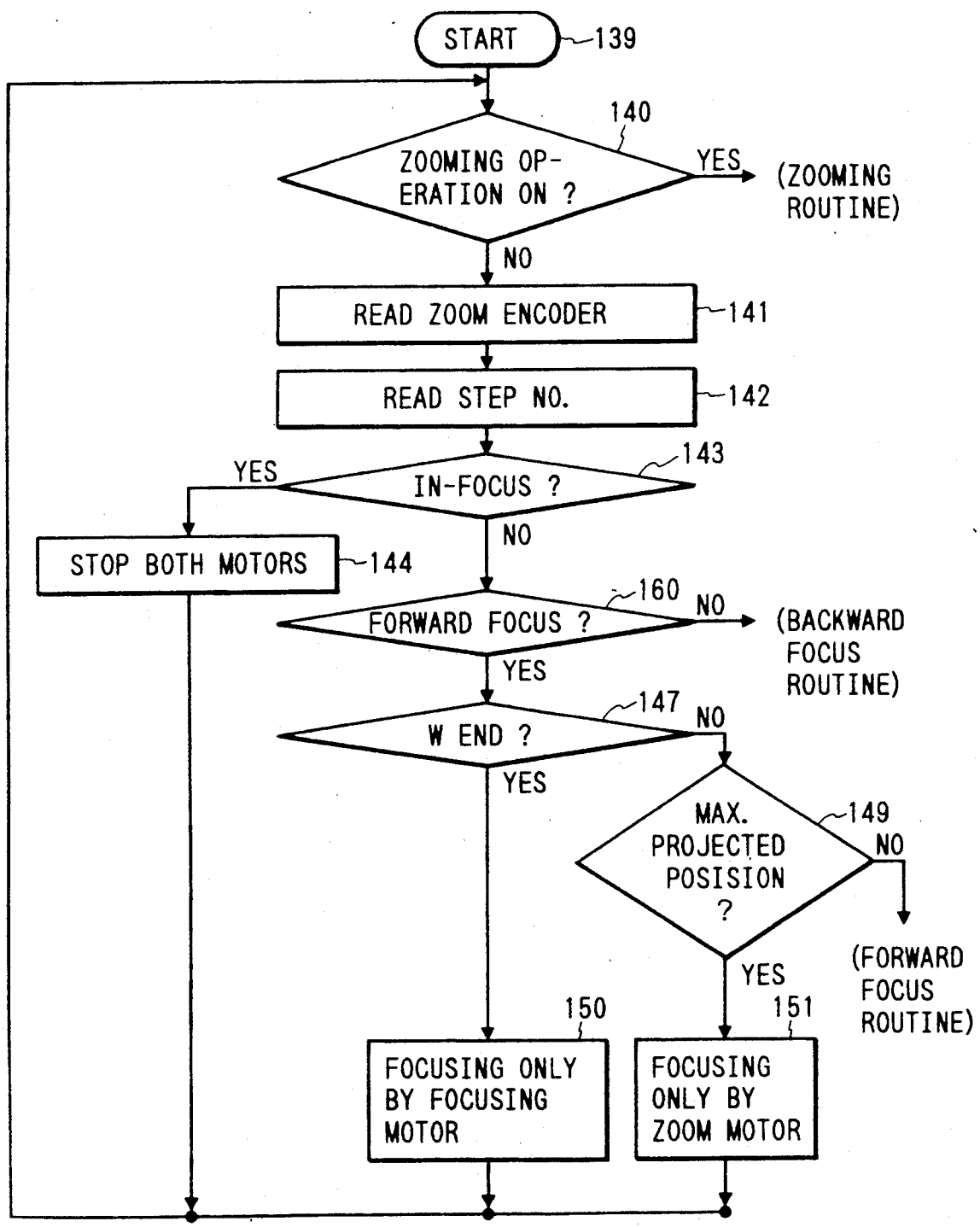
FIG. 31 consisting of FIGS. 31A and 31B is a flow chart of the control sequence of the seventh embodiment.
Figure 31B:
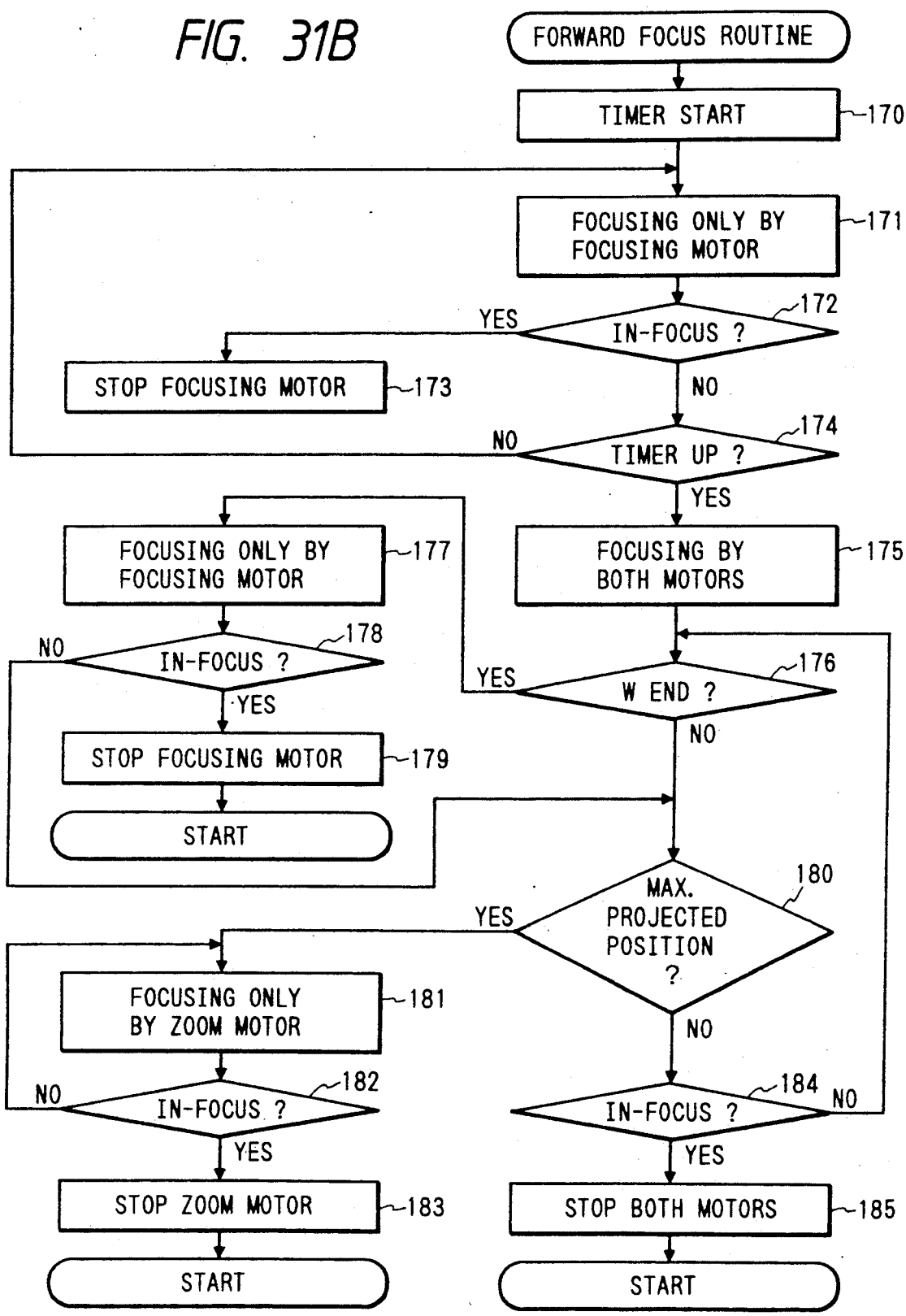

Now reference is made to FIG. 31 for explaining the 7th embodiment, employing a lens system shown in FIGS. 6 to 8, in which, in case of focusing from the initial position to a shorter object distance, the focusing motor alone is initially driven for a predetermined period, and, if the in-focus state is not reached within said period, the focusing motor and the zooming motor are both driven for focusing. For example, in case of focusing from an initial point P70 focused at 2 m to an object at 0 m, the focusing motor alone is initially driven for a predetermined period to a point P71, and then the focusing motor and the zooming motor are both driven to a point P72 where the wide angle end is reached. Thus, the focusing motor alone is thereafter driven to the point P0 focused to 0 m. Also in case the focusing operation starts from a point P73 focused to the infinite distance, the focusing motor alone is initially driven to a point P74, then the focusing motor and the zooming motor are both driven to a point P75, and then the zooming motor alone is driven to the point P0.

The block diagram for said 7th embodiment can be the same as that shown in FIG. 1.

The flow chart for said 7th embodiment shown in FIG. 31 is partially different from that in FIG. 26.

In the following there will be explained steps different from those in FIG. 26. In an out-of-focus state, a step 160 discriminates whether the lens is focused in front of or behind the object, and in case of a rear-focus state, the sequence proceeds to another rear-focus routine. In case of a front-focus state, the sequence proceeds to a step 147, and then to a front-focus routine only in case the zooming lens group is not at the wide angle end and the focusing lens group is not at the fully advanced position. In the following there will be explained said front-focus routine:

A step 170 resets and immediately starts a timer.

A step 171 executes focusing by driving the focusing motor 27 only.

A step 172 discriminates whether the in-focus state can be reached by the focusing motor 27 only. If the in-focus state is detected, the sequence proceeds to a step 173, but, if the out-of-focus state continues, the sequence proceeds to a step 174.

A step 173 stops the focusing motor 27 as the in-focus state is reached.

A step 174 discriminates whether the timer has measured a predetermined time, and the sequence proceeds to a step 175 or 171 respectively when said predetermined period has expired or not.

A step 175 drives the motors 27, 29 for reducing the focusing time, as the object is at a very short distance.

A step 176 detects whether the zooming lens group has reached the wide angle end position, and the sequence proceeds to a step 177 or 180 respectively when the wide angle end position is reached or not.

A step 177 executes focusing by driving the focusing motor 27 alone.

A step 178 discriminates whether the in-focus state has been reached, and the sequence proceeds to a step 179 or 180 respectively when the in-focus state is reached or not.

A step 179 stops the focusing motor 27 as the in-focus state has been reached, and the sequence returns to the start position.

A step 180 discriminates whether the focusing lens group is in the fully advanced position, and the sequence proceeds to a step 181 or 184 respectively if said lens group is in said fully advanced position or not.

A Step 181 stops the focusing motor 27 since the focusing lens group is in the fully advanced position, and executes the focusing with the zooming lens group by driving the zooming motor 29 alone.

A step 182 discriminates whether the in-focus state has been reached, and the sequence proceeds to a step 183 or returns to the step 181 respectively if the in-focus state is reached or not.

A step 183 stops the zooming motor 29 as the in-focus state has been reached, and the sequence returns to the start position.

A step 184 discriminates whether the in-focus state has been reached, and the sequence proceeds to a step 185 or returns to the step 176 respectively if the in-focus state is reached or not.

A step 185 stops the motors 27, 29 as the infocus state has been reached, and the sequence returns to the start position.

The present 7th embodiment is featured by a fact that, in the control of lens groups for focusing, the duration of driving of the focusing lens group alone is controlled by time. Consequently, in a focusing operation to a very short distance, the focusing lens group alone is driven, as in the conventional system, for a predetermined period for focusing to a short distance, and, for an object of a very short distance to which the lens cannot still be focused, the zooming lens group is moved to the wider angle side in combination with the focusing lens group.

In contrast to the foregoing 4th to 6th embodiments in which the lens control is switched according to the position of the focusing lens group, the present 7th embodiment is based on a different concept in which said switching is based on time. However, if the focusing lens group is in the ordinary photographing area, the function of the 7th embodiment is substantially the same as that in the 4th to 6th embodiments, as shown in FIG. 31, thereby providing a similar effect.

Figure 32:
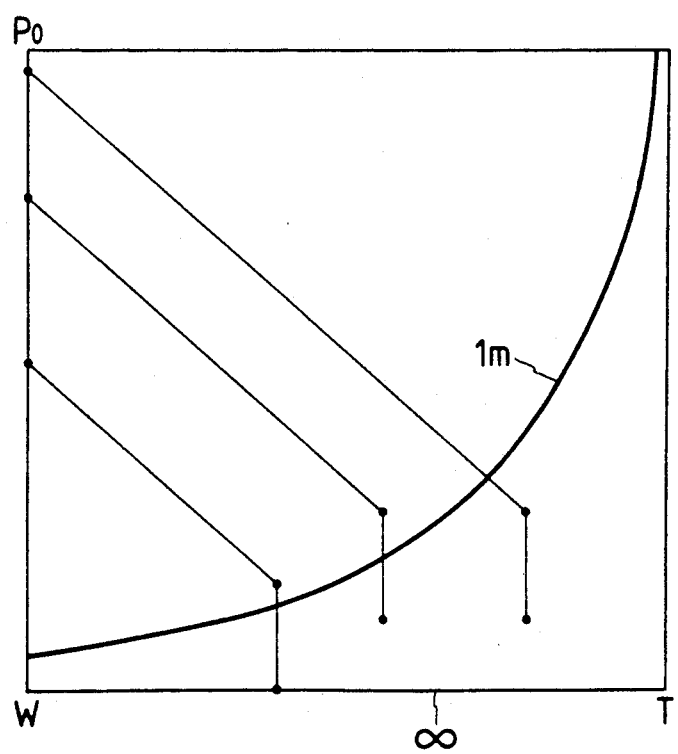
FIG. 32 is a chart showing focusing trajectories of an eighth embodiment.

The control of said 7th embodiment can also be applied to the lens system shown in FIG. 5 to obtain an 8th embodiment shown in FIG. 32.

Said 8th embodiment is the same as the 7th embodiment except for the structure of the lens system.

Although not explained in detail, it is also effective in practice to vary the period of single driving of the focusing motor 27 according to the position of the zooming lens group, more specifically to shorten, for example, said predetermined period when the zooming lens group is positioned at the wide angle end.

It is also effective to apply the concept of the 6th embodiments to the 7th or 8th embodiment.

The foregoing embodiments utilize the movement of the zooming lens group also in the focusing operation, thereby reducing the time required for focusing and enabling focusing to an object at a very short distance, without an excessively noticeable change in the image angle. Also in the 4th to 8th embodiments, the focusing operation is conducted by the focusing lens group only without any change in the image angle in the ordinary photographing range. Thus, there can be obtained an optical equipment with a lens position control device not giving an uneasy feeling to the photographer.

In the foregoing embodiments, the focusing and the zooming are achieved by axial movements of lens groups. However the present invention is likewise effective in the methods of focusing and zooming by varying the refractive force of the optical system through a change in the thickness or other physical properties of optical elements.

I claim:
1. An optical equipment comprising:
  (a) a first lens group for varying image magnification;
  (b) a second lens group for focusing, positioned at the focal plane side of said first lens group;
  (c) first detection means for detecting at least the state of image magnification of said first lens group;
  (d) second detection means for detecting the focus state; and
  (e) control means for varying the control for said first and second lens groups according to the discrimination by said first detection means whether the image magnification obtained by said first lens group is at the wide angle side or at the telephoto side of a predetermined image magnification, in case said second detection means identifies a necessity, for the purpose of focusing, of moving said second lens group in a direction for focusing to a shorter object distance, wherein said control means is adapted to effect the focusing operation by moving said second lens group in said direction for focusing to a shorter object distance and said first lens group to the wide angle side only in case said first lens group is at said wide angle side of said predetermined image magnification 2. An optical equipment according to claim 1, wherein said control means is adapted to drive said first and second lens groups by independent electromechanical converter means.

3. An optical equipment according to claim 1, wherein said control means is adapted to effect the focusing operation by moving said second lens group alone in said direction for focusing to a shorter object distance, in case said first lens group is at the telephoto side of said predetermined image magnification.

4. An optical equipment according to claim 1, wherein said second detection means is of a type incapable of determining the exact amount of defocus.

5. An optical equipment according to claim 1, wherein said equipment is a photographic camera.

6. An optical equipment comprising:
(a) a first lens group for varying image magnification;
(b) a second lens group for focusing, positioned at the focal plane side of said first lens group;
(c) first detection means for detecting at least the position of said first lens group;
(d) second detection means for detecting the focus state; and
(e) control means for varying the control for said first and second lens groups according to the discrimination by said first detection means whether said first lens group is at the wide angle side or at the telephoto side of a predetermined position, in case said second detection means identifies a necessity, for the purpose of focusing, of moving said second lens group in a direction for focusing to a shorter object distance, wherein said control means is adapted to effect the focusing operation by moving said second lens group in said direction for focusing to a shorter object distance and said first lens group to the wide angle side only in case said first lens group is at said wide angle side of said predetermined position.

7. An optical equipment according to claim 6, wherein said control means is adapted to axially move said first and second lens groups by means of motors.

8. An optical equipment according to claim 6, wherein said control means is adapted to effect the focusing operation by moving said second lens group alone in said direction for focusing to a shorter object distance, in case said first lens group is at the telephoto side of said predetermined position.

9. An optical equipment according to claim 6, wherein said second detection means is of a type incapable of determining the exact amount of defocus.

10. An optical equipment according to claim 6, wherein said first detection means is adapted to detect the position by means of an encoder.

11. An optical equipment according to claim 6, wherein said equipment is a photographic camera.

12. An optical equipment according to claim 7, wherein said control means comprises a microcomputer and is adapted to effect the movement and stopping of said first and second lens groups by programmed control of said motor.

13. An optical equipment according to claim 12, wherein the information on said predetermined position is memorized in said microcomputer.

14. An optical equipment according to claim 6, wherein said control means is adapted, in moving both said first and second lens groups for the purpose of focusing, to vary the moving speed of at least said first lens group according to the position of said first lens group in such a manner as to increase the moving speed of said first lens group as said first lens group approaches to an end position at the wide angle side.

15. An optical equipment comprising:
(a) a first lens group for varying image magnification;
(b) a second lens group for focusing, positioned at the focal plane side of said first lens group;
(c) first detection means for detecting at least the focal state of said second lens group;
(d) second detection means for detecting the focus state; and
(e) control means for varying the control for said first and second lens groups according to the discrimination by said first detection means whether said second lens group is at the shorter distance side or the infinite distance side of a predetermined focus state, in case said second detection means identifies a necessity, for the purpose of focusing, of moving said second lens group in a direction for focusing to a shorter object distance, wherein said control means is adapted to effect the focusing operation by moving said second lens group in said direction for focusing to a shorter object distance and said first lens group to the wide angle side only in case said second lens group is at the shorter distance side of said predetermined focus state.

16. An optical equipment according to claim 15, wherein said control means is adapted to drive said first and second lens groups by independent electromechanical converter means.

17. An optical equipment according to claim 15, wherein said control means is adapted to effect the focusing operation by moving said second lens group alone in said direction for focusing to a shorter object distance, in case said second lens group is at the infinite distance side of said predetermined focus state.

18. An optical equipment according to claim 15, wherein said second detection means is of a type incapable of determining the exact amount of defocus.

19. An optical equipment according to claim 15, wherein said equipment is a photographic camera.

20. An optical equipment comprising:
(a) a first lens group for varying image magnification;
(b) a second lens group for focusing, positioned at the focal plane side of said first lens group;
(c) first detection means for detecting at least the position of said second lens group;
(d) second detection means for detecting the focus state; and
(e) control means for varying the control for said first and second lens groups according to the discrimination by said first detection means whether said second lens group is at a side for focusing to a shorter distance or a side for focusing to the infinite distance with respect to a predetermined position, in case said second detection means identifies a necessity, for the purpose of focusing, of moving said second lens group to the side for focusing to a shorter distance, wherein said control means is adapted to effect the focusing operation by moving said second lens group to the side for focusing to a shorter distance and said first lens group to the wide angle side only in case said second lens group is at the side for focusing to a shorter distance, with respect to said predetermined position.

21. An optical equipment according to claim 20, wherein said control means is adapted to axially move said first and second lens groups by means of motors.

22. An optical equipment according to claim 20, wherein said control means is adapted to effect the focusing operation by moving said second lens group alone to the side for focusing to a shorter distance, in case said second lens group is at the side for focusing to the infinite distance, with respect to said predetermined position.

23. An optical equipment according to claim 20, wherein said second detection means is of a type incapable of determining the exact amount of defocus.

24. An optical equipment according to claim 21, wherein said first detection means is adapted to detecting the position of said second lens group, by determining the amount of movement of said motor.

25. An optical equipment according to claim 20, wherein said equipment is a photographic camera.

26. An optical equipment according to claim 21, wherein said control means comprises a microcomputer and is adapted to effect the movement and stopping of said first and second lens groups by programmed control of said motors.

27. An optical equipment according to claim 26, wherein the information on said predetermined position is memorized in said microcomputer.

28. An optical equipment according to claim 20, wherein said control means is adapted, in moving both said first and second lens groups for the purpose of focusing, to vary the moving speed of at least said first lens group according to the position of said first lens group, in such a manner as to increase the moving speed of said first lens group as said first lens group approaches to an end position at the wide angle side.

29. An optical equipment comprising:
 (a) a first lens group for varying image magnification;
 (b) a second lens group for focusing, positioned at the focal plane side of said first lens group;
 (c) detection means for detecting the focus state; and
 (d) control means for actuating, in case said detection means identifies a necessity, for the purpose of focusing, of actuating said second lens group to a side for focusing to a shorter distance, said second lens group being actuated to said side for focusing to a shorter distance for a predetermined period, and, if an in-focus state is not yet reached, actuating said second lens group to the side for focusing to a shorter distance and said first lens group to the wide angle side.

30. An optical equipment according to claim 29, wherein said control means is adapted to drive said first and second lens groups by independent electromechanical converter means.

31. An optical equipment according to claim 29, wherein said detection means is of a type incapable of detecting the exact amount of defocus.

32. An optical equipment according to claim 29, wherein said equipment is a photographic camera.

33. An optical equipment comprising:
 (a) a first lens group for varying image magnification;
 (b) a second lens group for focusing, positioned at the focal plane side of said first lens group;
 (c) detection means for detecting the focus state; and
 (d) control means for moving, in case said detection means identifies a necessity, for the purpose of focusing, of moving said second lens group up to a side for focusing to a shorter distance, said second lens group being actuated said side for focusing to a shorter distance for a predetermined period, and, if an in-focus state is not yet reached, moving said second lens group to the side for focusing to a shorter distance and said first lens group to the wide angle side.

34. An optical equipment according to claim 33, wherein said control means is adapted to axially move said first and second lens groups by means of motors.

35. An optical equipment according to claim 33, wherein said detection means is of a type incapable of detecting the exact amount of defocus.

36. An optical equipment according to claim 33, wherein said equipment is a photographic camera.

37. An optical equipment according to claim 34, wherein said control means comprises a microcomputer and is adapted to effect the movement and stopping of said first and second lens groups by programmed control of said motors.

* * * * *

UNITED STATES PATENT AND TRADEMARK OFFICE
CERTIFICATE OF CORRECTION

PATENT NO. : 5,027,147
DATED : June 25, 1991
INVENTOR(S) : Naoya Kaneda

Page 1 of 3

It is certified that error appears in the above-identified patent and that said Letters Patent is hereby corrected as shown below:

SHEET 18 OF THE DRAWINGS:

In Fig. 31A, "POSISION" should read --POSITION--.

COLUMN 1:

Line 50, "the" should read --the proper positioning of the --.

COLUMN 2:

Line 31, "automatic" should read --an automatic-- and "an" should be deleted.

Figure 11C:
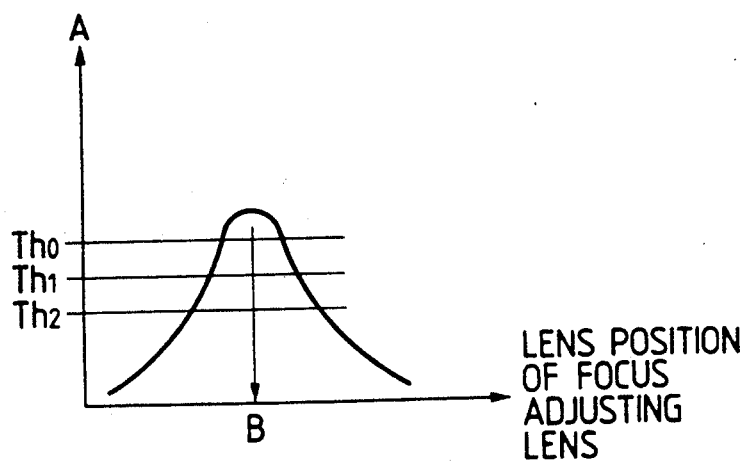
Figure 12:
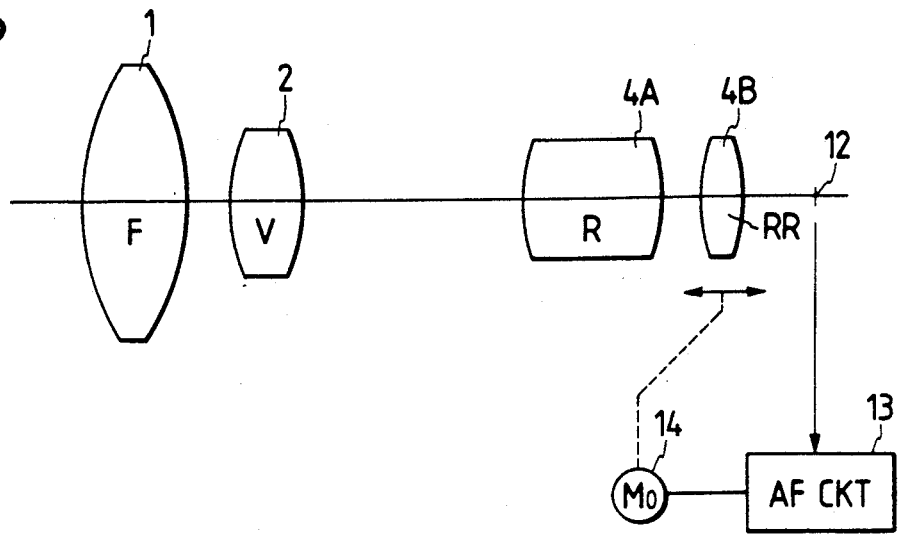
FIG. 12 is a schematic view showing the combination of an inner focus lens and an automatic focusing device.

Line 42, "Fig. 11" should read --Fig. 11C--.

COLUMN 3:

Line 30, "but" should read --it--.

Line 66, "inner" should read --the inner--.

COLUMN 5:

Line 30, "though" should read --through--.

Line 31, "hand" should read --hand,--.

COLUMN 6:

Line 49, "position" should read --position.--.

UNITED STATES PATENT AND TRADEMARK OFFICE
CERTIFICATE OF CORRECTION

PATENT NO. : 5,027,147

DATED : June 25, 1991

INVENTOR(S) : Naoya Kaneda

It is certified that error appears in the above-identified patent and that said Letters Patent is hereby corrected as shown below:

COLUMN 8:

Line 3, "thethird" should read --the third--.

Line 67, "P20 P21, P22 P23, P24 P25, P26 P27, P28 P29" should read --$\overline{P20\ P21}$, $\overline{P22\ P23}$, $\overline{P24\ P25}$, $\overline{P26\ P27}$, $\overline{P28\ P29}$--.

Line 68, "P30 P31," should read --$\overline{P30\ P31}$,--.

COLUMN 10:

Line 51, "present" (second occurrence) should be deleted.

COLUMN 12:

Line 27, "lines P40 P41 P42, P43 P44 P45," should read --lines $\overline{P40\ P41\ P42}$, $\overline{P43\ P44\ P45}$,--.

Line 28, "..., P61 P62 P63 and P64 P65 P66," should read --..., $\overline{P61\ P62\ P63}$ and $\overline{P64\ P65\ P66}$,--.

COLUMN 13:

Line 56, "Step 181" should read --step 181--.

UNITED STATES PATENT AND TRADEMARK OFFICE
CERTIFICATE OF CORRECTION

PATENT NO. : 5,027,147

DATED : June 25, 1991

INVENTOR(S) : Naoya Kaneda

It is certified that error appears in the above-identified patent and that said Letters Patent is hereby corrected as shown below:

COLUMN 14:

Line 1, "infocus" should read --in-focus--.

Line 35, "embodiments" should read --embodiment--.

COLUMN 15:

Line 10, "magnification" should read --magnification.--.

COLUMN 17:

Line 22, "detect-" should read --detect--.

Line 23, "ing" should be deleted.

COLUMN 18:

Line 29, "said" should read --to said--.

Signed and Sealed this

Twentieth Day of April, 1993

*Attest:*

MICHAEL K. KIRK

*Attesting Officer*     *Acting Commissioner of Patents and Trademarks*